United States Patent [19]

Radigan, Jr. et al.

[11] Patent Number: 5,554,213
[45] Date of Patent: Sep. 10, 1996

[54] INK COMPOSITIONS FOR INK JET PRINTING

[75] Inventors: Edward J. Radigan, Jr., Hamlin; Richard L. Colt, Rochester; Kurt B. Gundlach, Pittsford; Miguel A. Fontanez, Rochester, all of N.Y.

[73] Assignee: Xerox Corporation, Stamford, Conn.

[21] Appl. No.: 347,937

[22] Filed: Dec. 1, 1994

Related U.S. Application Data

[63] Continuation-in-part of Ser. No. 227,828, Apr. 14, 1994, Pat. No. 5,389,133, said Ser. No. 136,146, Oct. 15, 1993, Pat. No. 5,389,131, is a continuation-in-part of Ser. No. 992,240, Dec. 17, 1992, Pat. No. 5,258,064.

[51] Int. Cl.⁶ .................................................. C09D 11/02
[52] U.S. Cl. ................... 106/22 H; 106/22 R; 106/20 R
[58] Field of Search .......................... 106/22 H, 22 R, 106/20 R, 19 F

[56] References Cited

U.S. PATENT DOCUMENTS

| | | | |
|---|---|---|---|
| 4,259,675 | 3/1981 | Mansukhani | 106/20 D |
| 4,410,364 | 10/1983 | Finlayson et al. | 106/20 B |
| 4,838,940 | 6/1989 | Kan et al. | 106/22 |
| 4,853,037 | 8/1989 | Johnson et al. | 106/22 |
| 4,920,361 | 4/1990 | Arahara et al. | 346/140 R |
| 5,006,170 | 4/1991 | Schwarz et al. | 106/20 D |
| 5,062,892 | 11/1991 | Halko | 106/22 |
| 5,164,232 | 11/1992 | Henseleit et al. | 106/20 D |
| 5,254,159 | 10/1993 | Gundlach et al. | 106/22 H |
| 5,258,064 | 11/1993 | Colt | 106/20 R |
| 5,389,131 | 2/1995 | Colt et al. | 106/20 R |
| 5,389,133 | 2/1995 | Gundlach et al. | 106/22 H |

FOREIGN PATENT DOCUMENTS

| | | |
|---|---|---|
| 425150A2 | 2/1991 | European Pat. Off. . |
| 53-085626 | 7/1978 | Japan . |
| 57-36170 | 2/1982 | Japan . |

*Primary Examiner*—Helene Klemanski
*Attorney, Agent, or Firm*—Judith L. Byorick

[57] ABSTRACT

Disclosed are ink compositions comprising water, a colorant, and a phosphite salt of the general formula

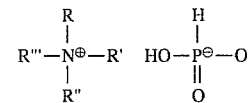

or

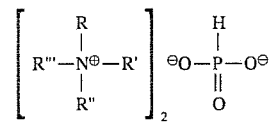

wherein R, R', R" and R'" can each, independently of each other, be hydrogen, an alkyl group, a substituted alkyl group, an aryl group, or a substituted aryl group. Also disclosed is a process for preparing an ink composition which comprises admixing water, a colorant, a base, and an acid selected from the group consisting of hypophosphoric acid, hypophosphorous acid, alkyl phosphonic acids, aryl phosphonic acids, alkyl phosphinic acids, aryl phosphinic acids, and mixtures thereof, wherein the pH of the ink is adjusted by a process selected from the group consisting of (a) adding the acid to an aqueous solution containing the base, and (b) adding the base to an aqueous solution containing the acid. Further disclosed are ink compositions comprising water, a colorant, and a salt selected from the group consisting of hypophosphate salts, hypophosphite salts, alkyl phosphite salts, aryl phosphite salts, alkyl phosphonite salts, aryl phosphonite salts, and mixtures thereof.

36 Claims, No Drawings

INK COMPOSITIONS FOR INK JET PRINTING

This a is a continuation-in-part of application U.S. Ser. No. 08/227,828 filed Apr. 14, 1994 now U.S. Pat. No. 5,389,133, entitled "Ink Compositions for Ink Jet Printing", and a continuation-in-part of application U.S. Ser. No. 08/116,146, filed Oct. 15, 1995 now U.S. Pat. No. 5,389,131, entitled "Ink Compositions and Preparation Processes Thereof", which is a continuation-in-part of U.S. Pat. No. 5,258,064 (U.S. Ser. No. 07/992,240 filed Dec. 17, 1992), entitled "Ink Compositions and Preparation Processes Thereof", the disclosures of each of which are totally incorporated herein by reference.

BACKGROUND OF THE INVENTION

The present invention is directed to aqueous ink compositions. More particularly, the present invention is directed to ink compositions suitable for use in ink jet printing processes. One embodiment of the present invention is directed to a process for preparing an ink composition which comprises admixing water, a colorant, a base, and phosphorous acid, wherein the pH of the ink is adjusted by a process selected from the group consisting of (a) adding phosphorous acid to an aqueous solution containing the base, and (b) adding the base to an aqueous solution containing phosphorous acid. Another embodiment of the present invention is directed to a process for preparing an ink composition which comprises (a) forming a mixture by admixing water and a base; (b) adding a colorant to the mixture; and (c) adjusting the pH of the mixture by adding phosphorous acid thereto. Yet another embodiment of the present invention is directed to a process for preparing an ink composition which comprises (a) forming a mixture by admixing water and phosphorous acid; (b) adding a colorant to the mixture; and (c) adjusting the pH of the mixture by adding a base thereto. The present invention also includes ink compositions prepared by these processes. One embodiment of the present invention is directed to an ink composition which comprises water, a colorant, and phosphorous acid. Another embodiment of the present invention is directed to an ink composition which comprises water, a colorant, and a phosphite salt. Yet another embodiment of the present invention is directed to an ink composition which comprises (a) water; (b) an anionic dye; (c) N,N'-bis(3-aminopropyl)-1,2-ethylenediamine; (d) a monoamine compound of the formula

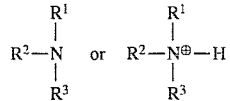

wherein $R^1$, $R^2$, and $R^3$ are independently selected from the group consisting of hydrogen, alkyl, and substituted alkyl; (e) a component selected from the group consisting of phosphorous acid and phosphite salts; and (f) an optional organic component selected from the group consisting of sulfolane, N-methyl pyrrolidone, dimethyl sulfoxide, and mixtures thereof. Still another embodiment of the present invention is directed to an ink composition which comprises water, an anionic dye, an organic component selected from the group consisting of sulfolane, dimethyl sulfoxide, and mixtures thereof, and anions selected from the group consisting of phosphite, hypophosphite, phosphate, polyphosphate, sulfate, hexafluorophosphate, glycolate, acetate, ethylenediaminetetraacetate, formate, borate, sulfite, sulfamate, and mixtures thereof. In another embodiment, the present invention is directed to an ink composition which comprises (a) water; (b) an anionic dye; (c) N,N'-bis(3-aminopropyl)-1,2-ethylenediamine; (d) a monoamine compound of the formula

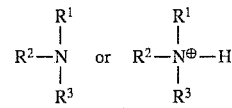

wherein $R^1$, $R^2$, and $R^3$ are independently selected from the group consisting of hydrogen, alkyl, and substituted alkyl; (e) betaine; and (f) an optional component selected from the group consisting of phosphorous acid and phosphite salts. In yet another embodiment, the present invention is directed to an ink composition which comprises (a) water; (b) dimethyl sulfoxide; (c) an anionic dye; (d) N,N'-bis(3-aminopropyl)-1,2-ethylenediamine; (e) a monoamine compound of the formula

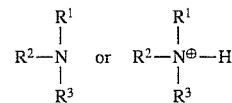

wherein $R^1$, $R^2$, and $R^3$ are independently selected from the group consisting of hydrogen, alkyl, and substituted alkyl; and (f) an optional component selected from the group consisting of phosphorous acid and phosphite salts. In still another embodiment, the present invention is directed to an ink composition which comprises (a) a liquid vehicle consisting essentially of water; (b) N,N'-bis(3-aminopropyl)-1,2-ethylenediamine; (c) an anionic dye; (d) betaine; (e) a monoamine; and (f) an optional component selected from the group consisting of phosphorous acid and phosphite salts. In a preferred embodiment, the ink composition comprises water, a colorant, and a phosphite salt of the general formula

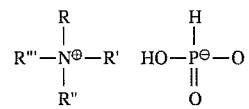

or

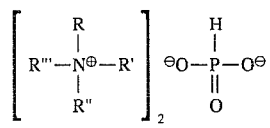

wherein R, R', R" and R'" can each, independently of each other, be hydrogen, an alkyl group, a substituted alkyl group, an aryl group, or a substituted aryl group. Another embodiment of the present invention is directed to a process for preparing an ink composition which comprises admixing water, a colorant, a base, and an acid selected from the group consisting of hypophosphoric acid, hypophosphorous acid, alkyl phosphonic acids, aryl phosphonic acids, alkyl phosphinic acids, aryl phosphinic acids, and mixtures thereof, wherein the pH of the ink is adjusted by a process selected from the group consisting of (a) adding the acid to an aqueous solution containing the base, and (b) adding the base to an aqueous solution containing the acid. Yet another embodiment of the present invention is directed to a process for preparing an ink composition which comprises (a) forming a mixture by admixing water and a base; (b) adding a colorant to the mixture; and (c) adjusting the pH of the mixture by adding thereto an acid selected from the group consisting of hypophosphoric acid, hypophosphorous acid, alkyl phosphonic acids, aryl phosphonic acids, alkyl phosphinic acids, aryl phosphinic acids, and mixtures thereof. Still another embodiment of the present invention is directed to a process for preparing an ink composition which comprises (a) forming a mixture by admixing water and an acid selected from the group consisting of hypophosphoric acid, hypophosphorous acid, alkyl phosphonic acids, aryl phosphonic acids, alkyl phosphinic acids, aryl phosphinic acids, and mixtures thereof; (b) adding a colorant to the mixture; and (c) adjusting the pH of the mixture by adding a base thereto. The present invention also includes ink compositions prepared by these processes. A further embodiment of the present invention is directed to an ink composition which comprises water, a colorant, and an acid selected from the group consisting of hypophosphoric acid, hypophosphorous acid, alkyl phosphonic acids, aryl phosphonic acids, alkyl phosphinic acids, aryl phosphinic acids, and mixtures thereof. Another embodiment of the present invention is directed to an ink composition which comprises water, a colorant, and a salt selected from the group consisting of hypophosphate salts, hypophosphite salts, alkyl phosphite salts, aryl phosphite salts, alkyl phosphonite salts, aryl phosphonite salts, and mixtures thereof.

Ink compositions for ink jet printing are known. For example, U.S. Pat. No. 5,062,892 (Halko) discloses ink jet ink compositions containing oxo anions (phosphates, polyphosphates, phosphate esters, arsenate, molybdate, sulfate, sulfite, and oxalate) in an amount of from 9 milligrams per liter to 14 weight percent. The oxo anion additive is included in the ink to reduce kogation in thermal ink jet printers.

In addition, U.S. Pat. No. 4,853,037 (Johnson et al.) discloses an ink composition for printing on plain paper using a thermal ink jet printer. The ink composition comprises at least one member selected from the group consisting of ethylene glycol and diethylene glycol, present in an amount ranging from about 5 to 10 weight percent, dye, ranging from about 1 to 4 weight percent, and the balance water. A biocide ranging from about 0.01 to 0.3 weight percent and/or a buffering agent, such as sodium borate, sodium hydrogen phosphate, or sodium dihydrogen phosphate, ranging in concentration from about 0.05 to 0.5 weight percent may also be included.

U.S. Pat. No. 4,920,361 (Arahara et al.) discloses an image recording method and an image recording apparatus using an ink which is substantially non-adhesive but can be imparted with an adhesiveness when subjected to a pH change. In the image recording method, the ink is subjected to a pattern of pH change to be provided with an adhesive pattern, which is then transferred to a recording medium, such as plain paper, directly or by the medium of an intermediate transfer medium to form an ink pattern corresponding to the pH change pattern.

U.S. Pat. No. 4,838,940 (Kan et al.) discloses an ink which can be imparted with an adhesiveness on application of an electric current. The ink is obtained by impregnating a crosslinked substance such as guar gum or polyvinyl alcohol compound with a liquid dispersion medium such as water. The ink is supplied with a pattern of energy to be provided with an adhesive pattern, which is then transferred to a recording medium, such as plain paper, directly or by the medium of an intermediate transfer medium to form an ink pattern corresponding to the energy pattern applied. The ink further comprises a buffer action-imparting substance and is excellent in storage stability and stability of performances during a continuous use.

Japanese Patent Publication 53-85626 discloses a water-based ink composition for ball point pens which comprises an aqueous water-soluble dye solution and a pH buffer. The pH buffer is either (i) NaOH and $KH_2PO_4$, (ii) $KH_2PO_4$ and $Na_2HPO_4$, (iii) citric acid and $Na_2HPO_4$, (iv) $KH_2PO_4$ and borax, (v) borax, or (vi) sodium tripolyphosphate, each providing an initial pH of 7 to 9.

Japanese Patent Publication 57-36170 discloses a water-based ink for ink jet printing containing water soluble dyes, a phosphoric ester type surfactant as a humectant, and water.

U.S. Pat. No. 5,258,064 (Colt), the disclosure of which is totally incorporated herein by reference, discloses a process for preparing an ink composition which comprises (a) forming a mixture by admixing water and a base; (b) adding a colorant to the mixture; and (c) adjusting the pH of the mixture by adding polyphosphoric acid thereto. Also disclosed is a process for preparing an ink composition which comprises (a) forming a mixture by admixing water and polyphosphoric acid; (b) adding a colorant to the mixture; and (c) adjusting the pH of the mixture by adding a base thereto. Further disclosed are ink compositions prepared by these processes. Additionally disclosed are processes which comprises incorporating these inks into an ink jet printing apparatus and causing droplets of the ink to be ejected in an imagewise pattern onto a substrate. The presence of polyphosphoric acid and the base create a buffer system in the ink which adjusts the ink to the desired pH, and also enables improved latency and waterfastness.

U.S. Pat. No. 5,254,159 (Gundlach et al.), the disclosure of which is totally incorporated herein by reference, discloses an ink composition which comprises water, an anionic dye, and a compound selected from the group consisting of N,N'-bis(3-aminopropyl)-1,2-ethylenediamine, 1,4-bis(3-aminopropyl)piperazine, N,N'-bis(3-aminopropyl)-1,3-propanediamine, N,N'-bis(2-aminoethyl)-1,3-propanediamine, N,N'-bis(3-aminopropyl)-1,4-butanediamine, ethylenediamine, diethylenetriamine, triethylenetetramine, tetraethylenepentamine, nitrilotrisethylamine, N,N'-(diaminoethyl)piperazine, piperazinylethylethylenediamine, aminoethyltriethylenetetramine, aminoethylpiperazinylethylethylenediamine, piperazinylethyldiethylenetriamine, pentaethylene hexamine, and mixtures thereof, said ink composition having a pH of more than about 8 and less than about 9. Further disclosed is an ink composition comprises water, a dye, a polyamine compound, and a monoamine compound of the general formula

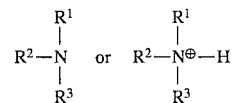

wherein $R^1$, $R^2$, and $R^3$ are independently selected from the group consisting of hydrogen, alkyl, and substituted alkyl. In one embodiment, the polyamine compound is a first generation dendrimer compound having terminal primary amine groups.

European Patent 425,150-A2 discloses oxo anions (both singly and multiply charged), such as phosphates, polyphosphates, and phosphate esters, which serve as additives, and in the case of cationic dyes, may serve as replacement counterions, for use in thermal ink jet inks to reduce kogation. The addition of the additive essentially eliminates kogation for the life of ink pens. The additives also prevent kogation for inks containing dyes with negatively charged water solubilizing groups, such as sulfonate and carboxylate.

U.S. Pat. No. 5,389,131 (Colt et al.), the disclosure of which is totally incorporated herein by reference, discloses a process for preparing an ink composition which comprises (a) forming a mixture by admixing water and a base; (b) adding a colorant to the mixture; and (c) adjusting the pH of the mixture by adding phosphorous acid thereto. Also disclosed is a process for preparing an ink composition which comprises (a) forming a mixture by admixing water and phosphorous acid; (b) adding a colorant to the mixture; and (c) adjusting the pH of the mixture by adding a base thereto. Further disclosed are ink compositions prepared by these processes. One embodiment is directed to an ink composition which comprises water, a colorant, and phosphorous acid. Another embodiment of the present invention is directed to an ink composition which comprises water, a colorant, and a phosphite salt. Additionally disclosed are processes which comprises incorporating these inks into an ink jet printing apparatus and causing droplets of the ink to be ejected in an imagewise pattern onto a substrate. The presence of phosphorous acid and the base create a buffer system in the ink which adjusts the ink to the desired pH, and also enables improved latency, recoverability, and waterfastness.

U.S. Pat. No. 5,389,133 (Gundlach et al.), the disclosure of which is totally incorporated herein by reference, discloses a process for preparing an aqueous ink composition which comprises adjusting the pH of the ink with phosphorous acid or phosphite salts. Also disclosed are ink compositions prepared by this process. In certain preferred embodiments, the ink compositions can also contain betaine, sulfolane, dimethyl sulfoxide, or N,N'-bis(3-aminopropyl)-1,2-ethylenediamine, as well as mixtures thereof. In other preferred embodiments, the ink composition comprises an organic component selected from the group consisting of sulfolane, dimethyl sulfoxide, and mixtures thereof, and anions selected from the group consisting of phosphite, hypophosphite, phosphate, polyphosphate, sulfate, hexafluorophosphate, glycolate, acetate, ethylenediaminetetraacetate, formate, borate, sulfite, sulfamate, and mixtures thereof.

Although known inks are suitable for their intended purposes, a need remains for improved ink compositions suitable for use in ink jet printing processes. In addition, there is a need for ink compositions which exhibit improved latency and recoverability in ink jet printers. Further, there is a need for ink compositions which exhibit improved latency and which also exhibit acceptable waterfastness, pH, viscosity, and surface tension and generate high quality images. Additionally, there is a need for ink compositions with good latency and acceptable pH for which a wide range of solvents is available so that the ink composition can be tailored for compatibility with specific colorants, improved waterfastness, adjusted viscosity, adjusted surface tension, or other important ink characteristics. There is also a need for ink compositions with both improved latency and improved apparent dry times and/or penetration rates into substrates. Further, there is a need for processes for adjusting the pH of aqueous ink compositions containing dyes wherein no crystallization of salts is observed in the pH-adjusted ink. In addition, there is a need for ink compositions for ink jet printing which are stable at pH values of less than about 7.0. There is also a need for ink compositions for ink jet printing wherein the ink exhibits improved waterfastness, in addition, there is a need for ink compositions for ink jet printing wherein the ink can be prepared with reduced filtration times. Further, there is a need for ink compositions for ink jet printing in which the desired ink components are highly soluble in the ink. Additionally, there is a need for ink compositions for ink jet printing which are well buffered and stable with respect to pH and to ambient environmental conditions such as heating, freezing, or the like.

SUMMARY OF THE INVENTION

It is an object of the present invention to provide ink compositions with the above noted advantages.

It is another object of the present invention to provide improved ink compositions suitable for use in ink jet printing processes.

It is yet another object of the present invention to provide ink compositions which exhibit improved latency and recoverability in ink jet printers.

It is still another object of the present invention to provide ink compositions which exhibit improved latency and which also exhibit acceptable waterfastness, pH, viscosity, and surface tension and generate high quality images.

Another object of the present invention is to provide ink compositions with good latency and acceptable pH for which a wide range of solvents is available so that the ink composition can be tailored for compatibility with specific colorants, improved waterfastness, adjusted viscosity, adjusted surface tension, or other important ink characteristics.

Yet another object of the present invention is to provide ink compositions with both improved latency and improved apparent dry times and/or penetration rates into substrates.

Still another object of the present invention is to provide processes for adjusting the pH of aqueous ink compositions containing dyes wherein no crystallization of salts is observed in the pH-adjusted ink.

It is another object of the present invention to provide ink compositions for ink jet printing which are stable at pH values of less than about 7.0.

It is yet another object of the present invention to provide ink compositions for ink jet printing wherein the ink exhibits improved waterfastness.

It is still another object of the present invention to provide ink compositions for ink jet printing wherein the ink can be prepared with reduced filtration times.

Another object of the present invention is to provide ink compositions for ink jet printing in which the desired ink components are highly soluble in the ink.

Yet another object of the present invention is to provide ink compositions for ink jet printing which are well buffered and stable with respect to pH and to ambient environmental conditions such as heating, freezing, or the like.

These and other objects of the present invention (or specific embodiments thereof) can be achieved by providing an ink composition which comprises water, a colorant, and phosphorous acid. Another embodiment of the present invention is directed to an ink composition which comprises water, a colorant, and a phosphite salt. Another embodiment of the present invention is directed to a process for preparing an ink composition which comprises admixing water, a colorant, a base, and phosphorous acid, wherein the pH of the ink is adjusted by a process selected from the group consisting of (a) adding phosphorous acid to an aqueous solution containing the base, and (b) adding the base to an aqueous solution containing phosphorous acid. Yet another embodiment of the present invention is directed to a process for preparing an ink composition which comprises (a) forming a mixture by admixing water and a base; (b) adding a colorant to the mixture; and (c) adjusting the pH of the mixture by adding phosphorous acid thereto. Still another embodiment of the present invention is directed to a process for preparing an ink composition which comprises (a) forming a mixture by admixing water and phosphorous acid; (b) adding a colorant to the mixture; and (c) adjusting the pH of the mixture by adding a base thereto. Another embodiment of the present invention is directed to an ink composition which comprises (a) water; (b) an anionic dye; (c) N,N'-bis(3-aminopropyl)-1,2-ethylenediamine; (d) a monoamine compound of the formula

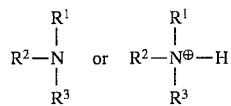

wherein $R^1$, $R^2$, and $R^3$ are independently selected from the group consisting of hydrogen, alkyl, and substituted alkyl; (e) a component selected from the group consisting of phosphorous acid and phosphite salts; and (f) an optional organic component selected from the group consisting of sulfolane, N-methyl pyrrolidone, dimethyl sulfoxide, and mixtures thereof. Yet another embodiment of the present invention is directed to an ink composition which comprises water, an anionic dye, an organic component selected from the group consisting of sulfolane, dimethyl sulfoxide, and mixtures thereof, and anions selected from the group consisting of phosphite, hypophosphite, phosphate, polyphosphate, sulfate, hexafluorophosphate, glycolate, acetate, ethylenediaminetetraacetate, formate, borate, sulfite, sulfamate, and mixtures thereof. Still another embodiment of the present invention is directed to an ink composition which comprises (a) water; (b) an anionic dye; (c) N,N'-bis(3-aminopropyl)-1,2-ethylenediamine; (d) a monoamine compound of the formula

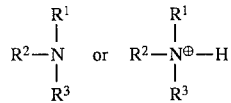

wherein $R^1$, $R^2$, and $R^3$ are independently selected from the group consisting of hydrogen, alkyl, and substituted alkyl; (e) betaine; and (f) an optional component selected from the group consisting of phosphorous acid and phosphite salts. In another embodiment, the present invention is directed to an ink composition which comprises (a) water; (b) dimethyl sulfoxide; (c) an anionic dye; (d) N,N'-bis(3-aminopropyl)-1,2-ethylenediamine; (e) a monoamine compound of the formula

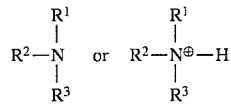

wherein $R^1$, $R^2$, and $R^3$ are independently selected from the group consisting of hydrogen, alkyl, and substituted alkyl; and (f) an optional component selected from the group consisting of phosphorous acid and phosphite salts. In yet another embodiment, the present invention is directed to an ink composition which comprises (a) a liquid vehicle consisting essentially of water; (b) N,N'-bis(3-aminopropyl)-1,2-ethylenediamine; (c) an anionic dye; (d) betaine; (e) a monoamine; and (f) an optional component selected from the group consisting of phosphorous acid and phosphite salts. In a preferred embodiment, the ink composition comprises water, a colorant, and a phosphite salt of the general formula

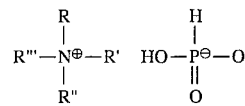

or

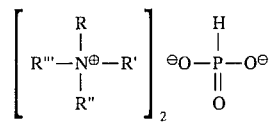

wherein R, R', R" and R'" can each, independently of each other, be hydrogen, an alkyl group, a substituted alkyl group, an aryl group, or a substituted aryl group. Another embodiment of the present invention is directed to a process for preparing an ink composition which comprises admixing water, a colorant, a base, and an acid selected from the group consisting of hypophosphoric acid, hypophosphorous acid, alkyl phosphonic acids, aryl phosphonic acids, alkyl phosphinic acids, aryl phosphinic acids, and mixtures thereof, wherein the pH of the ink is adjusted by a process selected from the group consisting of (a) adding the acid to an aqueous solution containing the base, and (b) adding the base to an aqueous solution containing the acid. Yet another embodiment of the present invention is directed to a process for preparing an ink composition which comprises (a) forming a mixture by admixing water and a base; (b) adding a colorant to the mixture; and (c) adjusting the pH of the mixture by adding thereto an acid selected from the group consisting of hypophosphoric acid, hypophosphorous acid, alkyl phosphonic acids, aryl phosphonic acids, alkyl phosphinic acids, aryl phosphinic acids, and mixtures thereof. Still another embodiment of the present invention is directed to a process for preparing an ink composition which comprises (a) forming a mixture by admixing water and an acid selected from the group consisting of hypophosphoric acid, hypophosphorous acid, alkyl phosphonic acids, aryl phosphonic acids, alkyl phosphinic acids, aryl phosphinic acids, and mixtures thereof; (b) adding a colorant to the mixture; and (c) adjusting the pH of the mixture by adding a base thereto. The present invention also includes ink compositions prepared by these processes. A further embodiment of the present invention is directed to an ink composition which comprises water, a colorant, and an acid selected from the group consisting of hypophosphoric acid, hypophosphorous acid, alkyl phosphonic acids, aryl phosphonic acids, alkyl phosphinic acids, aryl phosphinic acids, and mixtures thereof. Another embodiment of the present invention is directed to an ink composition which comprises water, a colorant, and a salt selected from the group consisting of hypophosphate salts, hypophosphite salts, alkyl phosphite salts, aryl phosphite salts, alkyl phosphonite salts, aryl phosphonite salts, and mixtures thereof.

DETAILED DESCRIPTION OF THE INVENTION

The liquid vehicle of the inks of the present invention may consist of water, or it may comprise a mixture of water and a miscible organic component, such as ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, such as sulfolane, alcohol derivatives, carbitol, butyl carbitol, cellusolve, ether derivatives, amino alcohols, ketones, N-methylpyrrolidinone, 2-pyrrolidone, cyclohexylpyrrolidone, hydroxyethers, amides, sulfoxides, such as dimethyl sulfoxide, lactones, and other water miscible materials, as well as mixtures thereof. When mixtures of water and water miscible organic liquids are selected as the liquid vehicle, the water to organic ratio may be in any effective range, and typically is from about 100:0 to about 30:70, preferably from about 97:3 to about 50:50, although the ratio can be outside this range. The non-water component of the liquid vehicle generally serves as a humectant which has a boiling point higher than that of water (100° C.). In the inks of the present invention, the liquid vehicle (comprising water plus humectant) is generally present in an amount of from about 60 to about 99.5 percent by weight, and preferably from about 75 to about 99 percent by weight, although the amount can be outside of this range. In one particularly preferred embodiment of the present invention, the liquid vehicle comprises a mixture of water, 2-pyrrolidinone or N-methyl pyrrolidinone, and sulfolane, of the formula

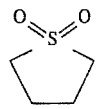

Preferably, in this embodiment, the liquid vehicle comprises water in an amount of from about 80 to about 90 parts by weight, sulfolane in an amount of from about 5 to about 10 parts by weight, and 2-pyrrolidinone or N-methyl pyrrolidinone in an amount of from about 5 to about 10 parts by weight, although the relative amounts can be outside this range.

In another preferred embodiment, the liquid vehicle comprises a mixture of water and dimethyl sulfoxide. In still another embodiment, the liquid vehicle consists essentially of water and dimethyl sulfoxide, with no other organic components present. In these embodiments, the dimethyl sulfoxide is typically present in the ink in an amount of from about 5 to about 30 percent by weight, preferably from about 8 to about 25 percent by weight, although the amount can be outside these ranges. In this embodiment, the ink typically comprises water, dimethyl sulfoxide, an anionic dye, N,N'-bis(3-aminopropyl)-1,2-ethylenediamine, a monoamine compound, and an optional component selected from the group consisting of phosphorous acid and phosphite salts. The dimethyl sulfoxide organic component enables advantages such as stabilization of the ink at relatively low pH values (such as about 5.5, for example), reduced adverse interactions between the ink and thermal ink jet hardware components, excellent waterfastness, good dry times, reduced showthrough, minimal feathering, excellent print edge sharpness on plain paper, good recoverability, and the like. In addition, if desired, the dimethyl sulfoxide enables the use of adds other than phosphorous acid, such as hydrochloric acid and other halide acids, for adjusting ink pH.

In yet another preferred embodiment, the liquid vehicle comprises a mixture of water and sulfolane. In yet another preferred embodiment, the liquid vehicle comprises a mixture of water, sulfolane, and dimethyl sulfoxide. In still another preferred embodiment, the liquid vehicle consists essentially of water, and contains no organic component.

Inks of the present invention contain a colorant. Generally, the colorant is a dye. Preferred dyes are the anionic dyes. Specific examples include Bernacid Red 2BMN, Pontamine Brilliant Bond Blue A, BASF X-34, Pontamine, Food Black 2, Carodirect Turquoise FBL Supra Conc. (Direct Blue 199), available from Carolina Color and Chemical, Special Fast Turquoise 8GL Liquid (Direct Blue 86), available from Mobay Chemical, Intrabond Liquid Turquoise GLL (Direct Blue 86), available from Crompton and Knowles, Cibracron Brilliant Red 38-A (Reactive Red 4), available from Aldrich Chemical, Drimarene Brilliant Red X-2B (Reactive Red 56), available from Pylam, Inc., Levafix Brilliant Red E-4B, available from Mobay Chemical, Levafix Brilliant Red E-6BA, available from Mobay Chemical, Procion Red H8B (Reactive Red 31), available from ICI America, Pylam Certified D&C Red #28 (Acid Red 92), available from Pylam, Direct Brill Pink B Ground Crude, available from Crompton & Knowles, Cartasol Yellow GTF Presscake, available from Sandoz, Inc., Tartrazine Extra Conc. (FD&C Yellow #5, Acid Yellow 23), available from Sandoz, Carodirect Yellow RL (Direct Yellow 86), available from Carolina Color and Chemical, Cartasol Yellow GTF Liquid Special 110, available from Sandoz, Inc., D&C Yellow # 10 (Acid Yellow 3), available from Triton, Yellow Shade 16948, available from Tricon, Basacid Black X34, available from BASF, Carta Black 2GT, available from Sandoz, Inc., Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Spirit Fast Yellow 3G, Aizen Spilon Yellow C-GNH (Hodagaya Chemical Company), Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI), Morfast Black Conc A (Morton-Thiokol), Diazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), Basacid Blue 750 (BASF), Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, available from Bayer, Procion Turquoise PA, Procion Turquoise HA, Procion Turquoise H-5G, Procion Turquoise H-7G, Procion Red MX-5B, Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, available from ICI, Cibacron Red F-B, Cibacron Black BG, Lanasol Black B, Lanasol Red 5B, Lanasol Red B, and Lanasol Yellow 4G, available from Ciba-Geigy, Basilen Black P-BR, Basilen Yellow EG, Basilen Brilliant Yellow P-3GN, Basilen Yellow M-6GD, Basilen Brilliant Red P-3B, Basilen Scarlet E-2G, Basilen Red E-B, Basilen Red E-7B, Basilen Red M-5B, Basilen Blue E-R, Basilen Brilliant Blue P-3R, Basilen Black P-BR, Basilen Turquoise Blue P-GR, Basilen Turquoise M-2G, Basilen Turquoise E-G, and Basilen Green E-6B, available from BASF, Sumifix Turquoise Blue 6, Sumifix Turquoise Blue H-GF, Sumifix Black B, Sumifix Black H-BG, Sumifix Yellow 26C, Sumifix Supra Scarlet 2GF, and Sumifix Brilliant Red 5BF, available from Sumitomo Chemical Company, Intracron Yellow C-8G, Intracron Red C-8B, Intracron Turquoise Blue GE, Intracron Turquoise HA, and Intracron Black RL, available from Crompton and Knowles, Dyes and Chemicals Division, and the like. Particularly preferred are dyes available from ICI Americas, Inc. of the chemical structure:

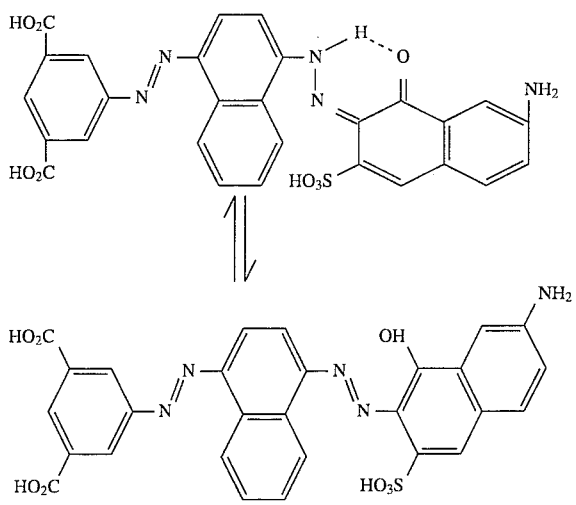

and those of the chemical structure

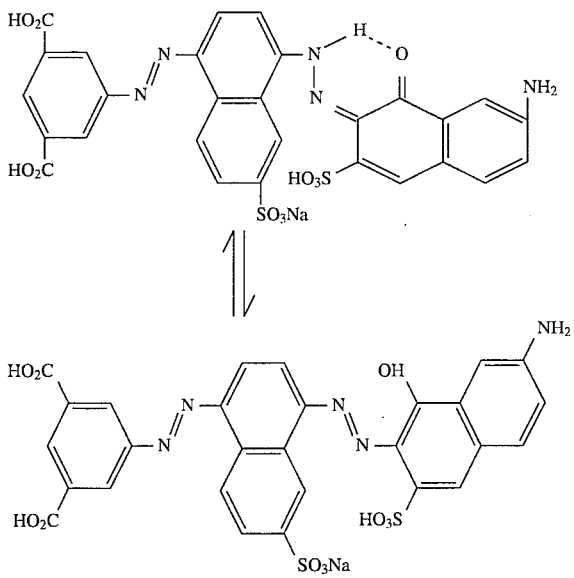

Also particularly preferred are BASF X-34 black dye (available from BASF) and Duasyn Brilliant Red F3B SF VP 218 (high purity solid, obtained from Hoechst, Coventry, R.I.). Dyes that are invisible to the naked eye but detectable when exposed to radiation outside the visible wavelength range (such as ultraviolet or infrared radiation), such as dansyl-lysine, N-(2-aminoethyl)-4-amino-3,6-disulfo-1,8-dinaphthalimide dipotassium salt, N-(2-aminopentyl)-4-amino-3,6-disulfo-1,8-dinaphthalimide dipotassium salt, Cascade Blue ethylenediamine trisodium salt (available from Molecular Proes, Inc.), Cascade Blue cadaverine trisodium salt (available from Molecular Proes, Inc.), bisdiazinyl derivatives of 4,4'-diaminostilbene-2,2'-disulfonic acid, amide derivatives of 4,4'-diaminostilbene-2,2'-disulfonic acid, phenylurea derivatives of 4,4'-disubstituted stilbene-2,2'-disulfonic acid, mono- or di-naphthyltriazole derivatives of 4,4'-disubstituted stilbene disulfonic acid, derivatives of benzothiazole, derivatives of benzoxazole, derivatives of benziminazole, derivatives of coumarin, derivatives of pyrazolines containing sulfonic acid groups, 4,4'-bis(triazin-2-ylamino)stilbene-2,2'-disulfonic acids, 2-(stilben-4-yl)naphthotriazoles, 2-(4-phenyistilben-4-yl)benzoxazoles, 4,4-bis(triazo-2-yl)stilbene-2,2'-disulfonic acids, 1,4-bis-(styryl)biphenyls, 1,3-diphenyl-2-pyrazolines, bis(benzazol-2-yl) derivatives, 3-phenyl-7-(triazin-2-yl)coumarins, carbostyrils, naphthalimides, 3,7-diaminodibenzothiophen-2,8-disulfonic acid-5,5-dioxide, other commercially available materials, such as C.I. Fluorescent Brightener No. 28 (C.I. 40622), the fluorescent series Leucophor B-302, BMB (C.I. 290), BCR, BS, and the like (available from Leucophor), and the like, are also suitable. The dye is present in the ink composition in any effective amount, typically from about 1 to about 20 percent by weight, and preferably from about 2 to about 10 percent by weight (wherein the amount refers to the amount of dye molecules present in the ink), although the amount can be outside of this range. A mixture of dyes in the proportions desired to obtain a specific shade may also be employed.

In addition, the colorant for the ink compositions of the present invention can be a pigment, or a mixture of one or more dyes and/or one or pigments. The pigment can be black, cyan, magenta, yellow, red, blue, green, brown, mixtures thereof, and the like. Examples of suitable black pigments include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index as CI 60710, CI Dispersed Red 15, a diazo dye identified in the Color Index as CI 26050, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro- 2,5-dimethoxy acetoacetanilide, Permanent Yellow FGL, and the like. Additional examples of pigments include Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange 6 (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow F6 1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF). Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 0.1 micron. The pigment is present in the ink composition in any effective amount, generally from about 1 to about 7 percent by weight and preferably from about 2 to about 5 percent by weight, although the amount can be outside of this range.

Ink compositions of the present invention are buffered to the desired pH by the addition of an acid, such as phosphorous acid, hypophosphorous acid, hypophosphoric acid, alkyl phosphonic acids, aryl phosphonic acids, alkyl phosphinic acids, aryl phosphinic acids, or the like, and a base. Phosphorous acid is of the formula $H_3PO_3$ (often written $HPO(OH)_2$), and is a dibasic acid which dissociates in water, under the appropriate pH conditions, to form the phosphite ions dihydrogen phosphite and monohydrogen phosphite, as follows:

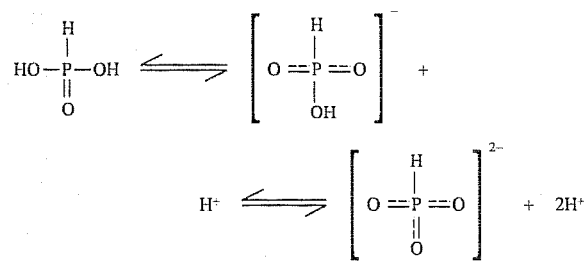

Neutralization of phosphorous acid by bases produces two series of salts, the dihydrogen phosphites, of the formula $H_2PO_3^-$[13], and the monohydrogen phosphites, of the formula $HPO_3^{2-}$. For example, if phosphorous acid is neutralized by an alkali metal hydroxide, such as sodium hydroxide, lithium hydroxide, potassium hydroxide, or the like, dihydrogen phosphite salts such as $NaH_2PO_3$, $LiH_2PO_3$, $KH_2PO_3$, or the like, as well as monohydrogen phosphite salts, such as $Na_2HPO_3$, $Li_2HPO_3$, $K_2HPO_3$, or the like, can be formed. For the purposes of the present invention, the term "phosphite salts" refers both to monohydrogen phosphites and dihydrogen phosphites. Phosphorous acid is commercially available from a number of suppliers, such as Aldrich, Milwaukee, Wis.

Other suitable acids include hypophosphoric acid, hypophosphorous acid, alkylphosphonic acids, arylphosphonic acids, alkylphosphinic acids, and arylphosphinic acids. Hypophosphoric acid is of the structural formula

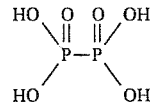

and is a tetrabasic acid which dissociates in water, under the appropriate pH conditions, to form the hypophosphate ions trihydrogen hypophosphate, dihydrogen hypophosphate, monohydrogen hypophosphate, and tetraanionic hypophosphate as follows:

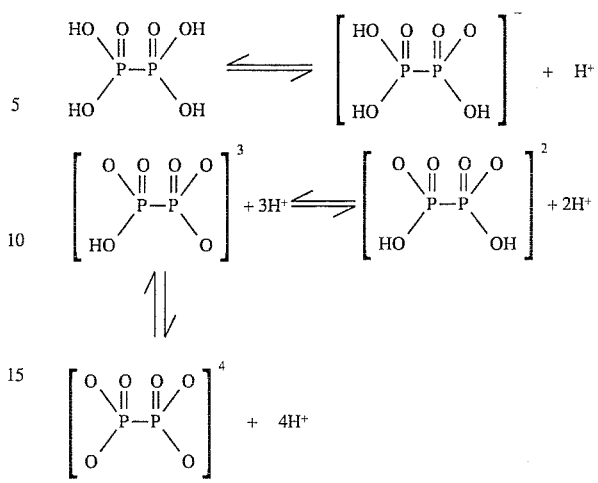

Neutralization of hypophosphoric acid by bases produces four series of salts, the trihydrogen hypophosphates, of the formula $H_3P_2O_6^-$, the dihydrogen hypophosphates, of the formula $H_2P_2O_6^{2-}$, the monohydrogen hypophosphates, of the formula $HP_2O_6^{3-}$, and the tetraanionic hypophosphates, of the formula $P_2O_6^{4-}$. For example, if hypophosphoric acid is neutralized by an alkali metal hydroxide, such as sodium hydroxide, lithium hydroxide, potassium hydroxide, or the like, trihydrogen hypophosphate salts such as $NaH_3P_2O_6$, $LiH_3P_2O_6$, $KH_3P_2O_6$, or the like, as well as dihydrogen hypophosphate salts, such as $Na_2H_2P_2O_6$, $Li_2H_2P_2O_6$, $K_2H_2P_2O_6$, or the like, monohydrogen hypophosphate salts, such as such as $Na_3HP_2O_6$, $LI_3HP_2O_6$, $K3HP_2O_6$, or the like, and tetraanionic hypophosphate salts, such as $Na_4P_2O_6$, $Li_4P_2O_6$, $K_4P_2O_6$, or the like, can be formed. For the purposes of the present invention, the term "hypophosphate salts" refers to tetraanionic hypophosphates, monohydrogen hypophosphates, dihydrogen hypophosphates, and trihydrogen hypophosphates. Hypophosphoric acid can be prepared by, for example, oxidizing red phosphorus with sodium chlorite ($NaClO_2$), as described in, for example, R. Tsuchida and Y. Nimura, *Kagaku* (Kyoto), 16, 71 (1961), the disclosure of which is totally incorporated herein by reference. Hypophosphoric acid can also be prepared as disclosed in, for example, J. A. Genge, B. A. Nevett, and J. E. Salmon, *Chem. Ind.* (London), 1081 (1960), the disclosure of which is totally incorporated herein by reference, by providing a reaction column 35×3.5 centimeters which is cooled with an internal tube (1.5 centimeters in diameter) and an external tube (6.0 centimeters in diameter). The reaction column is packed with alternate layers of glass beads (0.3 to 0.4 centimeters in diameter) and 35 grams of red phosphorus supported on porcelain chips and glass wool. The red phosphorus is precleaned by digestion with 10% hydrochloric acid and then washed. A solution of 135 grams of sodium chlorite in 750 milliliters of water is passed through at a rate of about 150 milliliters per hour while maintaining the effluent temperature at 15° to 18° C. The disodium salt, $Na_2H_2P_2O_6.H_2O$, or the tetrasodium salt, $Na_4P_2O_6.10H_2O$, is crystallized from the effluent at pH 5.2 or 10, respectively. After the recrystallization is carried out twice from water, 45 grams of the disodium salt of purity greater than 99.5% can be obtained. Hypophosphoric acid monohydrate, $H_4P_2O_6.H_2O$, is crystallized from an effluent obtained by passing a solution of the disodium salt of hypophosphoric acid through a column of cation exchange resin (H form). Oxidation of red phosphorus with alkaline solutions of hydrogen peroxide, potassium permanganate, sodium hypochlorite, or sodium hypobromite, or with acid solutions of potassium persulfate, sodium bromate, or sodium chlorate also results in formation of hypophosphoric acid, as disclosed in H. Remy and H. Falius, *Z. Anorg. Allgem. Chem.*, 306, 211 (1960), the disclosure of which is totally incorporated herein by reference. Further, oxidation of yellow phosphorus with copper nitrate leads to formation of hypophosphoric acid salts, as disclosed in J. R. Van Wazer, *Phosphorus and Its Compounds*, Vol. 1, Interscience, New York (1958), pp. 345–418, the disclosure of which is totally incorporated herein by reference. Additionally, hypophosphoric acid can be formed by reducing phosphoric acid and by oxidizing hydrolysis products of diphosphorus tetraiodide or phosphorus triiodide with iodine, as disclosed in Van Wazer. The decahydrate of the tetrasodium salt of hypophosphoric acid can also be prepared from red phosphorus and bleaching powder, as disclosed in W. G. Palmer, *J. Chem. Soc.*, 1079 (1961), the disclosure of which is totally incorporated herein by reference. Further information regarding hypophosphoric acid is disclosed in, for example, S. Ohasi, "Lower Oxo Acids of Phosphorus and Their Salts", in *Topics in Phosphorus Chemistry*, Vol. 1, M. Grayson et al., eds., New York (1964), the disclosure of which is totally incorporated herein by reference.

Hypophosphorous acid is of the structural formula

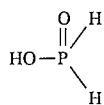

and is a monobasic acid which dissociates in water, under the appropriate pH conditions, to form the hypophosphite ion as follows:

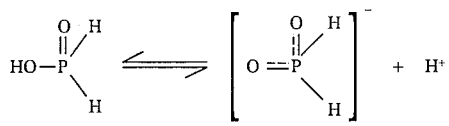

Neutralization of hypophosphorous acid by bases produces a hypophosphate salt of the formula $H_2PO_2^-$. For example, if hypophosphorous acid is neutralized by an alkali metal hydroxide, such as sodium hydroxide, lithium hydroxide, potassium hydroxide, or the like, hypophosphite salts such as $NaH_2PO_2$, $LiH_2PO_2$, $KH_2PO2$, or the like, can be formed. Hypophosphorous acid is commercially available from a number of suppliers, such as Aldrich, Milwaukee, Wis. Hypophosphorous acid and its salts can also be prepared by boiling white phosphorus with alkali or alkaline earth hydroxides, as disclosed in, for example, F. A. Cotton and G. Wilkinson, *Advanced Inorganic Chemistry*, Fourth ed., p. 473, John Wiley & Sons, New York (1980), the disclosure of which is totally incorporated herein by reference.

Alkyl phosphonic acids are of the general structural formula

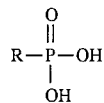

wherein R is an alkyl group, preferably with from 1 to about 16 carbon atoms, and more preferably with from 1 to about 12 carbon atoms, although more carbon atoms can be present, or a substituted alkyl group, preferably with from 1 to about 16 carbon atoms, and more preferably with from 1 to about 12 carbon atoms, although more carbon atoms can be present, with examples of suitable substituents including alkyl groups, aryl groups, hydroxyl groups (—OH), sulfate groups (—$SO_4$), ether groups (—OR, wherein R is either alkyl or aryl), or the like. Alkyl phosphonic acids are dibasic acids which dissociate in water, under the appropriate pH conditions, to form the corresponding alkylphosphite ions monohydrogen alkylphosphite and dianionic alkylphosphite, as follows:

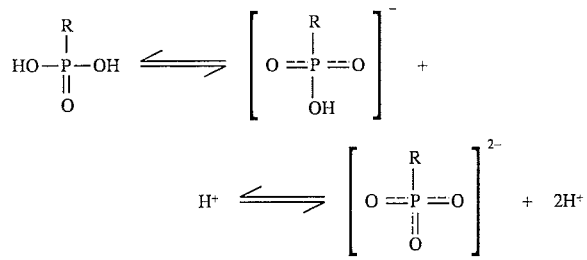

Neutralization of alkyl phosphonic acids by bases produces two series of salts, the monohydrogen alkylphosphites, of the formula $RHPO_3^-$, and the dianionic alkylphosphites, of the formula $RPO_3^{2-}$. For example, if an alkyl phosphonic acid is neutralized by an alkali metal hydroxide, such as sodium hydroxide, lithium hydroxide, potassium hydroxide, or the like, monohydrogen alkyl phosphite salts such as $NaRHPO_3$, $LiRHPO_3$, $KRHPO_3$, or the like, as well as dianionic alkyl phosphite salts, such as $Na_2RPO_3$, $Li_2RPO_3$, $K_2RPO_3$, or the like, can be formed. For the purposes of the present invention, the term "alkyl phosphite salts" refers both to monohydrogen alkyl phosphites and dianionic alkyl phosphites. Examples of suitable alkyl phosphonic acids include methylphosphonic acid, available from Aldrich Chemical Co., Milwaukee, Wis. (28,986-8; CAS # 993-13-5), ethyl phosphonic acid (CAS # 15845-6), and the like.

Aryl phosphonic acids are of the general structural formula

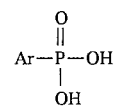

wherein Ar is an aryl group, preferably with from 6 to about 14 carbon atoms, and more preferably with from 6 to about 10 carbon atoms, although more carbon atoms can be present, or a substituted aryl group, preferably with from 6 to about 22 carbon atoms, and more preferably with from 6 to about 18 carbon atoms, although more carbon atoms can be present, with examples of suitable substituents including alkyl groups, aryl groups, hydroxyl groups (—OH), sulfate groups (—$SO_4$), ether groups (—OR, wherein R is either alkyl or aryl), or the like. Aryl phosphonic acids are dibasic acids which dissociate in water, under the appropriate pH conditions, to form the corresponding arylphosphite ions monohydrogen arylphosphite and dianionic arylphosphite, as follows:

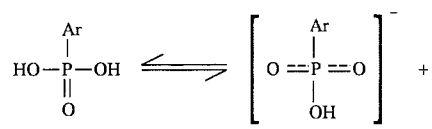

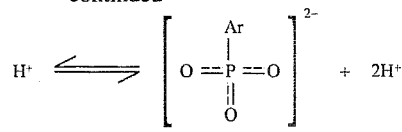

Neutralization of aryl phosphonic acids by bases produces two series of salts, the monohydrogen arylphosphites, of the formula $ArHPO_3{}^-$, and the dianionic aryl phosphites, of the formula $ArPO_3{}^{2-}$. For example, if an aryl phosphonic acid is neutralized by an alkali metal hydroxide, such as sodium hydroxide, lithium hydroxide, potassium hydroxide, or the like, monohydrogen aryl phosphite salts such as $NaArHPO_3$, $LiArHPO_3$, $KArHPO_3$, or the like, as well as dianionic aryl phosphite salts, such as $Na_2ArPO_3$, $Li_2ArPO_3$, $K_2ArPO_3$, or the like, can be formed. For the purposes of the present invention, the term "aryl phosphite salts" refers both to monohydrogen aryl phosphites and dianionic aryl phosphites. Examples of suitable aryl phosphonic acids include phenylphosphonic acid, available from Aldrich Chemical Co., Milwaukee, Wis. (P2,880-8; CAS # 1571-33-1), and the like.

Alkyl phosphonic acids and their salts and aryl phosphonic acids and their salts can also be prepared as disclosed in, for example, H. Z. Lecher et al., "The Phosphonation of Aromatic Compounds with Phosphoric Anhydride," *J. Am. Chem. Soc.*, vol. 76, p. 1045 et seq. (1954); H. Z. Lecher et al., "The Phosphonation of Aromatic Compounds with Phosphorus Pentasulfide," *J. Am. Chem. Soc.*, vol. 76, p. 5018 et seq. (1954); and Kresge, Taug, *J. Org. Chem.*, vol. 42, No. 4, p. 757 et seq. (1977); the disclosures of each of which are totally incorporated herein by reference.

Alkyl phosphinic acids (also known as alkyl phosohonous acids) are of the general structural formulae

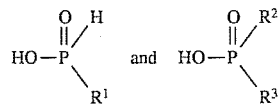

wherein $R^1$, $R^2$, and $R^3$ are each, independently of the others, alkyl groups, preferably with from 1 to about 16 carbon atoms, and more preferably with from 1 to about 12 carbon atoms, although more carbon atoms can be present, or substituted alkyl groups, preferably with from 1 to about 16 carbon atoms, and more preferably with from 1 to about 12 carbon atoms, although more carbon atoms can be present, with examples of suitable substituents including alkyl groups, aryl groups, hydroxyl groups (—OH), sulfate groups (—$SO_4$), ether groups (—OR, wherein R is either alkyl or aryl), or the like. Alkyl phosphinic acids are monobasic acids which dissociate in water, under the appropriate pH conditions, to form the corresponding alkylphosphonite ions as follows:

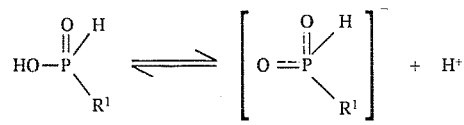

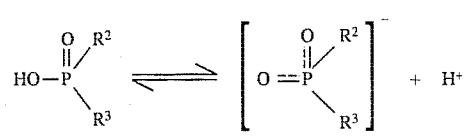

Neutralization of dialkyl phosphinic acids by bases produces the dialkylphosphonite salts, of the formula $R_2PO_2{}^-$, and neutralization of monoalkyl phosphinic acids by bases produces the monoalkylphosphonite salts, of the formula $RHPO_2{}^-$. For example, if a monoalkyl phosphinic acid is neutralized by an alkali metal hydroxide, such as sodium hydroxide, lithium hydroxide, potassium hydroxide, or the like, monoalkyl phosphonite salts such as $NaRHPO_2$, $LiRHPO_2$, $KRHPO_2$, or the like, can be formed. If a dialkyl phosphinic acid is neutralized by an alkali metal hydroxide, such as sodium hydroxide, lithium hydroxide, potassium hydroxide, or the like, dialkyl phosphite salts, such as $NaR_2PO_2$, $LiR_2PO_2$, $KR_2PO_2$, or the like, can be formed. For the purposes of the present invention, the term "alkyl phosphonite salts" refers both to monoalkyl phosphonites and dialkyl phosphonites. Alkyl phosphinic acids can be prepared by indirect replacement of one or both hydrogen atoms on hypophosphorous acid ($H_3PO_2$) as disclosed in, for example, F. A. Cotton and G. Wilkinson, *Advanced Inorganic Chemistry*, Fourth ed., p. 473, John Wiley & Sons, New York (1980), the disclosure of which is totally incorporated herein by reference.

Aryl phosphinic acids (also known as aryl phosohonous acids) are of the general structural formulae

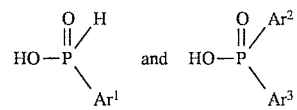

wherein $Ar^1$, $Ar^2$, and $Ar^3$ are each, independently of the others, aryl groups, preferably with from 6 to about 14 carbon atoms, and more preferably with from 6 to about 10 carbon atoms, although more carbon atoms can be present, or substituted aryl groups, preferably with from 6 to about 22 carbon atoms, and more preferably with from 6 to about 18 carbon atoms, although more carbon atoms can be present, with examples of suitable substituents including alkyl groups, aryl groups, hydroxyl groups (—OH), sulfate groups (—$SO_4$), ether groups (—OR, wherein R is either alkyl or aryl), or the like. Aryl phosphinic acids are monobasic acids which dissociate in water, under the appropriate pH conditions, to form the corresponding arylphosphonite ions as follows:

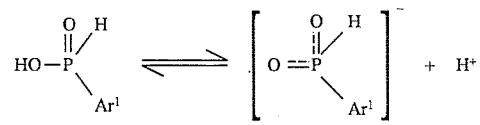

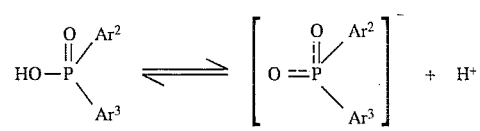

Neutralization of diaryl phosphinic acids by bases produces the diarylphosphonite salts, of the formula $Ar_2PO_2{}^-$, and neutralization of monoaryl phosphinic acids by bases produces the monoarylphosphonite salts, of the formula $ArHPO_2{}^-$. For example, if a monoaryl phosphinic acid is neutralized by an alkali metal hydroxide, such as sodium hydroxide, lithium hydroxide, potassium hydroxide, or the like, monoaryl phosphonite salts such as $NaArHPO_2$, $LiArHPO_2$, $KArHPO_2$, or the like, can be formed. If a diaryl phosphinic acid is neutralized by an alkali metal hydroxide, such as sodium hydroxide, lithium hydroxide, potassium hydroxide, or the like, diaryl phosphite salts, such as $NaAr_2PO_2$, $LiAr_2PO_2$, $KAr_2PO_2$, or the like, can be formed. For the purposes of the present invention, the term "aryl phosphonite salts" refers both to monoaryl phosphonites and diaryl phosphonites. Examples of suitable aryl phosphinic acids include phenylphosphinic acid, available from Aldrich Chemical Co., Milwaukee, Wis., and the like.

Alkyl phosphinic acids and their salts, and aryl phosphinic acids and their salts, can also be prepared as disclosed in, for example, A. Finch et al., "Studies on Phenylphosphorus Dihalides," J. Chem. Soc. (B), p. 1162 et seq. (1966); and L. D. Quin and M. R. Dysart, "Arylphosphinic Acids: Dissociation Constants and Reaction with Diazomethane," J. Org. Chem, Vol. 27, p. 1012 et seq. (1962); the disclosures of each of which are totally incorporated herein by reference.

Mixtures of these acids, as well as mixtures of these acids with other acids such as phosphorous acid, polyphosphoric acid, or the like can also be employed.

The acid is added to the ink composition in an amount of at least about 0.1 percent by weight of the ink, preferably from about 0.1 to about 10 percent by weight, and more preferably from about 0.25 to about 5 percent by weight, although the amount can be outside these ranges.

The base can be any suitable base which forms an effective buffer system in the ink in combination with the phosphorous acid. Preferably, the base is sufficiently volatile to leave the liquid vehicle as the ink dries. Typically, the base is a monoamine compound. The monoamine compound may be a primary amine, a secondary amine, or a tertiary amine. In general, any compound of the general formula

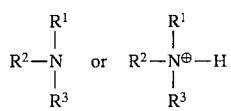

wherein $R^1$, $R^2$, and $R^3$ are independently selected from the group consisting of hydrogen, alkyl (preferably with from 1 to about 10 carbon atoms), and substituted alkyl groups (preferably with from 1 to about 10 carbon atoms)(with examples of suitable substituents on the alkyl groups including carboxylic acid, sulfonic acid, phosphonic acid, alcohol, ether, siloxy, and the like), is suitable for this embodiment of the invention. Specific examples of suitable monoamine compounds include ammonia, ammonium salts, methylamine, dimethylamine, trimethylamine, ethylamine, diethylamine, triethylamine, ethylene diamine, tris(hydroxymethyl) aminomethane (TRIS), tris[2-(2-methoxyethoxy)ethyl]amine (TDA-1), taurine, 2-aminoethylphosphonic acid, 4-aminobutyric acid, 3-aminopropyl triethoxysilane, 2-aminoethylthiol, ethanolamine, triethanolamine, and the like, as well as mixtures thereof. The base or monoamine is added to the ink composition in any effective amount. For example, for a base which is an ammonium hydroxide solution in water (61% $NH_4OH$), typical amounts are at least about 0.1 percent by weight of the ink, preferably from about 0.1 to about 10 percent by weight, and more preferably from about 1 to about 2 percent by weight, although the amount can be outside these ranges. For bases of higher molecular weight, proportionally greater amounts can be used. The amount of base present can also be expressed in terms of the number of molar equivalents of base per molar equivalent of dye in the ink. Typically, the amount of base is from about 0.5 to about 25 molar equivalents of base per molar equivalent of dye, preferably from about 2 to about 10 molar equivalents of base per molar equivalent of dye, although the amount can be outside these ranges.

In a particularly preferred embodiment, the ink compositions of the present invention contain water, a colorant, and a phosphite salt of the general formula

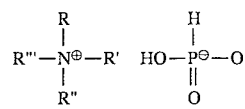

or

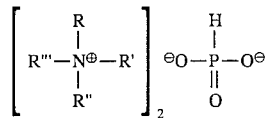

wherein R, R', R" and R'" can each, independently of each other, be hydrogen, an alkyl group, preferably with from 1 to about 16 carbon atoms, and more preferably with from 1 to about 12 carbon atoms, a substituted alkyl group, preferably with from 1 to about 16 carbon atoms, and more preferably with from 1 to about 12 carbon atoms, an aryl group, preferably with from 6 to about 14 carbon atoms, and more preferably with from 6 to about 10 carbon atoms, or a substituted aryl group, preferably with from 6 to about 16 carbon atoms, and more preferably with from 6 to about 10 carbon atoms, with examples of substituents including alkyl groups, aryl groups, hydroxyl groups (—OH), sulfate groups (—$SO_4$), ether groups (—OR, wherein R is an alkyl group or an aryl group), amine groups (—NRR', wherein R and R' are each, independently of the other, alkyl, substituted alkyl, aryl, or substituted aryl), sulfone groups, phosphone groups, and the like. Preferred examples of salts of these formulae include ammonium phosphite (typically both monohydrogen and dihydrogen present in equilibrium, although either is suitable) and triethanolamine phosphite (typically both monohydrogen and dihydrogen present in equilibrium, although either is suitable). The presence of these amine phosphite salts can improve ink recoverability when the ink is incorporated into a thermal ink jet printhead and printing is ceased for a period and then resumed. These materials also function as buffers in the ink over a wide pH range and further help improve the solubility of other ink components, such as dyes, in the ink. The salt preferably is present in the ink composition in an amount of from about 0.1 to about 10 percent by weight.

The inks of the present invention can also contain betaine. Betaine is of the structural formula

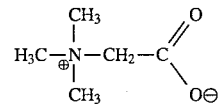

and is commercially available from, for example, Aldrich Chemical Co., Milwaukee, Wis. Specifically, the combination of betaine with an anionic dye, a monoamine, and N,N'-bis(3-aminopropyl)-1,2-ethylenediamine is believed to be particularly advantageous in the inks of the present invention, and enables advantages such as improved ink stability, improved recoverability of an ink jet printing apparatus after idle periods when the ink is present in the printer and the nozzles are uncapped, improved waterfastness, reduced feathering of the images on plain papers, reduced showthrough, and the like. While not being limited to any particular theory, it is believed that the presence of the monoamine, particularly if the monoamine is in cationic form and is present in a large molar excess (such as about 10 times the molar amount of the dye) displaces the cations associated with the anionic dye as it is received from the dye manufacturer. The monoamine cations are then easily displaced by the quaternary ammonium carboxylate zwitterion, betaine, which in effect places ionic tails onto the dye molecules with carboxylate ends. The partially protonated N,N'-bis(3-aminopropyl)-1,2-ethylenediamine is then believed to displace the monoamine cations associated with the carboxylate tails to form a waterfast coagulate matrix when the mixture is absorbed onto a printing substrate such as paper. This mixture of ingredients thus produces a stable ink composition at relatively neutral pH values which, when applied to a substrate such as paper, is highly waterfast.

When present, betaine typically is in the ink in an amount of from about 1 to about 30 percent by weight, preferably from about 2 to about 25 percent by weight, and more preferably from about 3 to about 20 percent by weight, although the amount can be outside these ranges. In one preferred embodiment, the present invention is directed to an ink which comprises water, an anionic dye, N,N'-bis(3-aminopropyl)-1,2-ethylenediamine, a monoamine compound, betaine, and an optional component selected from the group consisting of phosphorous acid and phosphite salts.

In another preferred embodiment, the inks of the present invention contain no organic component (such as sulfolane, dimethylsulfoxide, N-methyl pyrrolidone, glycols, glycol ethers, or the like) and the ink comprises (a) a liquid vehicle consisting essentially of water; (b) N,N'-bis(3-aminopropyl)-1,2-ethylenediamine; (c) an anionic dye; (d) betaine; (e) a monoamine; and (f) an optional component selected from the group consisting of phosphorous acid and phosphite salts. In this embodiment, the inks display excellent print quality with minimum variability across a wide variety of plain papers. In addition, printer recoverability and print quality are excellent.

Another embodiment of the present invention is directed to an ink composition which comprises water, an anionic dye, an organic component selected from the group consisting of sulfolane, dimethyl sulfoxide, and mixtures thereof, and anions selected from the group consisting of phosphite, hypophosphite, phosphate, polyphosphate, sulfate, hexafluorophosphate, glycolate, acetate, ethylenediaminetetraacetate, formate, borate, sulfite, sulfamate, and mixtures thereof. In this embodiment, the ink in the nozzle of an ink jet printer undergoes a phase separation, such that the phase at the air interface is rich in the organic component and the dye. Behind this high boiling organic "capping" phase is a water phase rich in the salts containing the anions. Behind the water phase in the ink channel or nozzle is situated the homogeneous full ink mixture. This "capping" phenomenon enables advantages such as improved long-term recoverability of idle printers containing the ink. While not being limited to any theory, it is believed that the polar aprotic sulfolane or dimethyl sulfoxide organic component cannot solvate "hard" anions which contain no hydroxyl functional groups, since the electronegative oxygen atoms in the organic component cannot hydrogen bond to these anions as efficiently as water can (since water contains electropositive hydrogens for efficient hydrogen bonding to the anions). In this embodiment of the present invention, the organic component typically is present in an amount of from about 5 to about 30 percent by weight, preferably from about 6 to about 25 percent by weight, although the amount can be outside these ranges, and the material (typically a salt or an acid) containing the anion typically is present in an amount of from about 0.5 to about 5 percent by weight, preferably from about 1 to about 3 percent by weight, although the amount can be outside these ranges.

The various ink ingredients can be admixed with each other in any desired order. For example, the base can be admixed with water, followed by addition of phosphorous acid, followed by addition of the colorant. Or, the base and the colorant can be admixed with water, followed by addition of phosphorous acid. Or, phosphorous acid can be admixed with water, followed by addition of the base, followed by addition of the colorant. Or, phosphorous acid and the colorant can be admixed with water, followed by addition of the base. Any additional ink ingredients, such as solvents, humectants, biocides, or the like, can be added at any desired stage of the ink preparation process.

The buffer system comprising the acid and the base enables the ink composition to be adjusted to a stable desired pH, generally within a range of from about 6.5 to about 10.0 and preferably from about 7.5 to about 9.0, although the pH can be outside these ranges. Buffering the pH within these ranges is generally preferred to prevent possible precipitation of the dyes from the ink at pH values lower than about 6.5 and to prevent possible loss of waterfastness and sharp print quality at pH values higher than about 10.0.

The inks of the present invention, buffered with a combination of one or more specific acids and a base, exhibit improved latency compared to inks buffered with other acids. Latency is the period during which the ink jet printer may stop printing while it contains the ink and subsequently be restarted without clogging of the nozzle. Latency in general should be as high as possible to enable restarting of the ink jet printer after extended idle periods. In most thermal ink jet inks, the choice of ink components in addition to water and colorant, such as glycols or other humectants, determines the latency of the ink. In the inks of the present invention, however, the buffer system enables improved latency; thus, the other ink ingredients can be selected to optimize other important ink characteristics such as waterfastness, viscosity, surface tension, or the like, all of which affect print quality. While not being limited to any particular theory, it is believed that some latency difficulties can arise when salts from an ink buffer system crystallize in or over the nozzles in an ink jet printhead. Crystallization can be reduced or eliminated by selecting ink components which will maintain these crystals in solution, but these ink components may eventually evaporate, leaving the crystals behind to block the nozzles. The combination of one or more specific acids and a base in the present invention, however, exhibits minimal tendencies to dry up or crystallize, and enables ink jet printers containing the ink which have been idle for extended periods to restart and jet acceptably with the first pulse. In addition, the combination of acid and base in the present invention enhances the waterfastness of the ink. Again, while not being limited to any particular theory, it is believed that the acid component in the ink resists crystallization because of the difficulty it would encounter in obtaining the proper geometry for crystal lattice packing. For example, ammonium phosphite is a highly hygroscopic material which will crystallize if placed in a desiccating oven at 60° (2, but will return to liquid at ambient conditions.

Other additives can also be present in the inks of the present invention. For example, one or more surfactants or wetting agents can be added to the ink. These additives may be of the cationic, anionic, or nonionic types. Suitable surfactants and wetting agents include sodium lauryl sulfate, Tamol® SN, Tamol® LG, those of the Triton® series available from Rohm and Haas Company, those of the Marasperse® series, those of the Igepal® series available from GAF Company, those of the Tergitol® series, and other commercially available surfactants. These surfactants and wetting agents are present in effective amounts, generally from 0 to about 15 percent by weight, and preferably from about 0.01 to about 8 percent by weight, although the amount can be outside of this range.

Polymeric additives can also be added to the inks of the present invention to enhance the viscosity of the ink and the stability of the pigment particles and to reduce the rate of agglomeration and precipitation of the particles. Water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, and the like are particularly useful for stabilizing pigment particles in a water based liquid vehicle such as water or a mixture of water and a water miscible organic liquid. Polymeric stabilizers may be present in the ink of the present invention in amounts of from 0 to about 10 percent by weight, and preferably from about 0.01 to about 5 percent by weight, although the amount can be outside of this range.

One preferred additive to the inks of the present invention is a polymeric additive consisting of two polyalkylene oxide chains bound to a central bisphenol-A moiety. This additive is of the formula

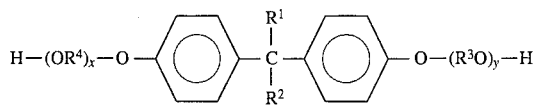

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide/bisphenol-A polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in *Polyethers*, N. G. Gaylord, John Wiley & Sons, New York (1963) and "Laboratory Synthesis of Polyethylene Glycol Derivatives," J. M. Harris, *J. Molecular Science—Rev. Macrotool. Chem. Phys.*, C25(3), 325–373 (1985), the disclosures of each of which are totally incorporated herein by reference. The polyalkylene oxide/bisphenol-A additive is generally present in the ink in an amount of at least about 1 part per million. Typically, the polyalkylene oxide/bisphenol-A additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825 (Schwarz), the disclosure of which is totally incorporated herein by reference.

Ink compositions of the present invention can also contain as optional additives polyamine compounds. Examples of suitable polyamine additives include N,N'-bis(3-aminopropyl)-1,2-ethylenediamine, 1,4-bis(3-aminopropyl)piperazine, N,N'-bis(3-aminopropyl)-1,3-propanediamine, N,N'-bis(2-aminoethyl)-1,3-propanediamine, N,N'-bis(3-aminopropyl)-1,4-butanediamine, ethylenediamine, diethylenetriamine, triethylenetetramine, tetraethylenepentamine, nitrilotrisethylamine, N,N'-(diaminoethyl)piperazine, piperazinylethylethylenediamine, aminoethyltriethylenetetramine, aminoethylpiperazinylethylethylenediamine, piperazinylethyldiethylenetriamine, pentaethylenehexamine, and the like, as well as mixtures thereof. These materials are commercially available from a variety of sources, including Aldrich Chemical Company, Milwaukee, Wis., Texaco, Inc., Houston, Tex., and Bayer (Canada) Inc., Point Claire, PQ. The polyamine or mixture of polyamines can be present in any effective or desired amount, typically from about 0.001 to about 5 percent by weight of the ink composition, preferably from about 0.01 to about 3 percent by weight of the ink composition, and more preferably from about 0.4 to about 2.0 percent by weight, although the amount can be outside of these ranges.

Other optional additives to the inks of the present invention include biocides such as Dowicil 150, 200, and 75, benzoate salts, sorbate salts, and the like, present in an amount of from about 0.0001 to about 4 percent by weight, and preferably from about 0.01 to about 2.0 percent by weight, additional pH controlling agents such as acids or bases, phosphate salts, carboxylates salts, sulfite salts, amine salts, and the like, present in an amount of from 0 to about 1 percent by weight and preferably from about 0.01 to about 1 percent by weight, or the like.

The ink compositions of the present invention are generally of a viscosity suitable for use in thermal ink jet printing processes. Typically, the ink viscosity is no more than about 5 centipoise, and preferably is from about 1 to about 2.5 centipoise.

Ink compositions of the present invention can be prepared by any suitable process. Typically, the inks are prepared by simple mixing of the ingredients. One process entails mixing all of the ink ingredients together and filtering the mixture to obtain an ink. Inks of the present invention can be prepared by preparing a conventional ink composition according to any desired process, such as by mixing the ingredients, heating if desired, and filtering, followed by adding the acid and base pH adjusting components of the present invention to the mixture and mixing at room temperature with moderate shaking until a homogeneous mixture is obtained, typically from about 5 to about 10 minutes. Alternatively, the ink additives of the present invention can be mixed with the other ink ingredients during the ink preparation process, which takes place according to any desired procedure, such as by mixing all the ingredients, heating if desired, and filtering.

The present invention is also directed to a process which entails incorporating an ink composition of the present invention into an ink jet printing apparatus and causing droplets of the ink composition to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern. Any suitable substrate can be employed, including plain papers such as Xerox® 4024 papers, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

An ink composition was prepared as follows. To 60.2 grams of deionized water was added 1.03 grams of N,N'-bis(3-aminopropyl)-1,2-ethylenediamine (obtained from BASF) and 2 grams of ammonium hydroxide. The resulting mixture was roll milled for 5 minutes, after which the pH of the mixture was 11.74. Thereafter, 2.91 grams of a 50 percent by weight solution of phosphorous acid (obtained from Rhone-Poulenc) was added to the mixture, which was then roll milled for another 5 minutes, after which the pH was 8.81. Subsequently, to the mixture was added 5 grams of betaine (hygroscopic, obtained from Aldrich Chemical Co.), 12.31 grams of 97 percent by weight sulfolane (obtained from Phillips 66 Company), 10.58 grams of BASF X-34 black dye (obtained from BASF), and 1.93 grams of a solution containing 16.0 percent by weight Direct Red 227 dye (obtained from Tricon Colors), followed by roll milling the mixture for 10 minutes. Thereafter, to the mixture was added 0.05 grams of polyethylene oxide (obtained from Polyscience), followed by roll milling the mixture for 30 minutes. The resulting mixture had a pH of 8.42. To this mixture was added an additional 0.14 grams of a 50 percent by weight solution of phosphorous acid, bringing the pH to 8.18. An additional 4.17 grams of deionized water was added, followed by roll milling for 30 minutes and subsequent filtering to yield an ink composition.

EXAMPLE II

An ink composition was prepared as follows. To 69.76 grams of deionized water was added 1.01 grams of N,N'-bis(3-aminopropyl)-1,2-ethylenediamine (obtained from BASF) and 2.06 grams of ammonium hydroxide. The resulting mixture was roll milled for 5 minutes, after which the pH of the mixture was 11.62. Thereafter, 3.62 grams of a 50 percent by weight solution of phosphorous acid (obtained from Rhone-Poulenc) was added to the mixture, which was then roll milled for another 5 minutes, after which the pH was 8.75. Subsequently, to the mixture was added 8.31 grams of 97 percent by weight sulfolane (obtained from Phillips 66 Company), 10.66 grams of BASF X-34 black dye (obtained from BASF), 1.93 grams of Duasyn Brilliant Red F3B SF VP218 dye (obtained from Hoechst), 0.05 grams of polyethylene oxide (obtained from Polysciences), and 0.099 grams of Dowicil 200 biocide (obtained from Dow Chemical), followed by roll milling the mixture for 15 minutes. The resulting mixture had a pH of 8.47. To this mixture was added an additional 0.19 grams of a 50 percent by weight solution of phosphorous acid, bringing the pH to 8.20. An additional 10.29 grams of deionized water was added, followed by roll milling for 10 minutes and subsequent filtering to yield an ink composition.

For comparison purposes, an ink composition was prepared by adding to 60.87 grams of deionized water 1.01 grams of of N,N'-bis(3 -aminopropyl)-1,2-ethylenediamine (obtained from BASF) and 2.01 grams of ammonium hydroxide. The resulting mixture was roll milled for 5 minutes, after which the pH of the mixture was 11.94. Thereafter, 3.67 grams of a 37 percent by weight solution of hydrochloric acid (obtained from Aldrich Chemical Company) was added to the mixture, which was then roll milled for another 5 minutes, after which the pH was 8.59. Subsequently, to the mixture was added 8.27 grams of 97 percent by weight sulfolane (obtained from Phillips 66 Company), 10.62 grams of BASF X-34 black dye (obtained from BASF), 0.29 grams of Duasyn Brilliant Red F3B SF VP218 dye (obtained from Hoechst), 0.05 grams of polyethylene oxide (obtained from Polysciences), and 0.102 grams of Dowicil 200 biocide (obtained from Dow Chemical), followed by roll milling the mixture for 15 minutes. The resulting mixture had a pH of 8.46. To this mixture was added an additional 0.57 grams of 3 Molar hydrochloric acid, bringing the pH to 8.20. An additional 12.66 grams of deionized water was added, followed by roll milling for 10 minutes and subsequent filtering to yield an ink composition.

The ink compositions thus prepared were each incorporated into a Hewlett-Packard DeskJet 500 thermal ink jet printer and prints were generated on paper. Latency and recoverability were tested by operating the printer in the "de-cap" mode, in which the built-in maintenance procedures of maintaining the ink jet nozzles capped in a high humidity environment, were circumvented. After generating prints, the printer was stopped for a 24 hour period, followed by again generating prints without any prior maintenance or priming of the nozzles. The ink composition prepared with phosphorous acid began generating high quality images after 1.5 pages of printing had been generated under these conditions. In contrast, the ink prepared with hydrochloric acid began generating high quality images after 6 pages of printing had been generated under these conditions.

EXAMPLE III

An ink composition was prepared as follows. To 17.97 grams of deionized water was added 0.52 grams of N,N'-bis(3-aminopropyl)-1,2-ethylenediamine (obtained from BASF) and 1 gram of ammonium hydroxide. The resulting mixture was roll milled for 5 minutes, after which the pH of the mixture was 12.00. Thereafter, 1.34 grams of a 70 percent by weight solution of phosphorous acid (obtained from Aldrich Chemical Company) was added to the mixture, bringing the pH to 8.10. An additional 0.19 gram of ammonium hydroxide was added, followed by roll milling for another 5 minutes, after which the pH was 8.62. Subsequently, to the mixture was added 12.5 grams of dimethyl sulfoxide (DMSO) (obtained from Baker Chemical Company), 13 grams of Direct Red 227 dye (containing 13.4 percent by weight dye solids, obtained from Tricon Colors), 0.0246 grams of polyethylene oxide (obtained from Polysciences), and 0.0494 grams of Dowicil 200 biocide (obtained from Dow Chemical), followed by roll milling the mixture for 15 minutes. The resulting mixture had a pH of 8.81. To this mixture was added an additional 0.17 grams of a 70 percent by weight solution of phosphorous acid, bringing the pH to 8.19. An additional 3.39 grams of deionized water was added, followed by roll milling for 10 minutes and subsequent filtering to yield an ink composition.

The ink composition thus prepared was incorporated into a Hewlett-Packard DeskJet 500 thermal ink jet printer and prints were generated on paper. Latency and recoverability were tested by operating the printer in the "de-cap" mode, in which the built-in maintenance procedures of maintaining the ink jet nozzles capped in a high humidity environment, were circumvented. After generating prints, the printer was stopped for a 24 hour period, followed by again generating prints without any prior maintenance or priming of the nozzles. The ink composition began generating high quality images after 1 page of printing had been generated under these conditions.

EXAMPLE IV

An ink composition was prepared as follows. To 15.92 grams of deionized water was added 0.52 grams of N,N'-bis(3-aminopropyl)-1,2-ethylenediamine (obtained from BASF) and 1 gram of ammonium hydroxide. The resulting mixture was roll milled for 5 minutes, after which the pH of the mixture was 11.60. Thereafter, 1.23 grams of a 70 percent by weight solution of phosphorous acid (obtained from Aldrich Chemical Company) was added to the mixture, followed by roll milling for 5 minutes, bringing the pH to 8.64. Subsequently, to the mixture was added 12.52 grams of dimethyl sulfoxide (DMSO) (obtained from Baker Chemical Company), 15.03 grams of Projet Cyan 1 Liquid dye (containing 10 percent by weight dye solids, obtained from ICI), 0.0255 grams of polyethylene oxide (obtained from Polysciences), and 0.0518 grams of Dowicil 200 biocide (obtained from Dow Chemical), followed by roll milling the mixture for 15 minutes. The resulting mixture had a pH of 8.85. To this mixture was added an additional 0.18 grams of a 70 percent by weight solution of phosphorous acid, bringing the pH to 8.20. An additional 3.61 grams of deionized water was added, followed by roll milling for 10 minutes and subsequent filtering to yield an ink composition.

The ink composition thus prepared was incorporated into a Hewlett-Packard DeskJet 500 thermal ink jet printer and prints were generated on paper. Latency and recoverability were tested by operating the printer in the "de-cap" mode, in which the built-in maintenance procedures of maintaining the ink jet nozzles capped in a high humidity environment, were circumvented. After generating prints, the printer was stopped for a 24 hour period, followed by again generating prints without any prior maintenance or priming of the nozzles. The ink composition began generating high quality images after 1.5 pages of printing had been generated under these conditions.

EXAMPLE V

An ink composition was prepared as follows. To 29.94 grams of deionized water was added 0.52 grams of N,N'-bis(3-aminopropyl)-1,2-ethylenediamine (obtained from BASF) and 1.02 gram of ammonium hydroxide. The resulting mixture was roll milled for 5 minutes, after which the pH of the mixture was 11.43. Thereafter, 1.23 grams of a 70 percent by weight solution of phosphorous acid (obtained from Aldrich Chemical Company) was added to the mixture, followed by roll milling for 5 minutes, bringing the pH to 8.65. Subsequently, to the mixture was added 12.5 grams of dimethyl sulfoxide (DMSO) (obtained from Baker Chemical Company), 1.5 grams of Carolina Direct Yellow 86 dye (obtained from Carolina), 0.0244 grams of polyethylene oxide (obtained from Polysciences), and 0.0503 grams of Dowicil 200 biocide (obtained from Dow Chemical), followed by roll milling the mixture for 15 minutes. The resulting mixture had a pH of 8.87. To this mixture was added an additional 0.17 grams of a 70 percent by weight solution of phosphorous acid, bringing the pH to 8.22. An additional 4.21 grams of deionized water was added, followed by roll milling for 10 minutes and subsequent filtering to yield an ink composition.

The ink composition thus prepared was incorporated into a Hewlett-Packard DeskJet 500 thermal ink jet printer and high quality prints were generated on paper.

EXAMPLE VI

An ink composition was prepared as follows. To 56.53 grams of deionized water was added 1.02 grams of N,N'-bis(3-aminopropyl)-1,2-ethylenediamine (obtained from BASF) and 2.02 grams of ammonium hydroxide. The resulting mixture was roll milled for 5 minutes, after which the pH of the mixture was 11.62. Thereafter, 2.77 grams of a 70 percent by weight solution of phosphorous acid (obtained from Aldrich Chemical Company) was added to the mixture, followed by roll milling for 5 minutes, bringing the pH to 7.94. Subsequently, to the mixture was added 18.55 grams of 97 percent by weight sulfolane (obtained from Phillips 66 Company), 0.3 gram of Duasyn Brilliant Red dye (obtained from Hoechst), 10.64 grams of BASF X-34 black dye (obtained from BASF), 0.0505 grams of polyethylene oxide (obtained from Polysciences), and 0.0996 grams of Dowicil 200 biocide (obtained from Dow Chemical), followed by roll milling the mixture for 15 minutes. The resulting mixture had a pH of 7.95. To this mixture was added an additional 0.61 grams of a 70 percent by weight solution of phosphorous acid, bringing the pH to 6.98. An additional 7.59 grams of deionized water was added, followed by roll milling for 10 minutes and subsequent filtering to yield an ink composition.

The ink composition thus prepared was incorporated into a Hewlett-Packard DeskJet 500 thermal ink jet printer and high quality prints were generated on paper. Latency and recoverability were tested by operating the printer in the "de-cap" mode, in which the built-in maintenance procedures of maintaining the ink jet nozzles capped in a high humidity environment, were circumvented. After generating prints, the printer was stopped for a 24 hour period, followed by again generating prints without any prior maintenance or priming of the nozzles. The ink composition began generating high quality images after 1.5 pages of printing had been generated under these conditions.

To 20.43 grams of the ink thus prepared was then added an additional 0.1 gram of a 70 percent by weight solution of phosphorous acid, followed by roll milling for 15 minutes and filtering, bringing the pH of the ink composition to 6.53. The ink composition thus prepared was incorporated into a Hewlett-Packard DeskJet 500 thermal ink jet printer and high quality prints were generated on paper. Latency and recoverability were tested by operating the printer in the "de-cap" mode, in which the built-in maintenance procedures of maintaining the ink jet nozzles capped in a high humidity environment, were circumvented. After generating prints, the printer was stopped for a 24 hour period, followed by again generating prints without any prior maintenance or priming of the nozzles. The ink composition began generating high quality images after 1 page of printing had been generated under these conditions.

EXAMPLE VII

Three aqueous ink compositions with the contents shown in the table below were prepared as described in Example I hereinabove. All amounts are percentage by weight in the ink of the indicated component, with the balance constituting water:

| Ink | Betaine | Dye | N-BAPED | Sulfolane | NH$_4$OH | PEO | H$_3$PO$_3$ |
|-----|---------|-------|---------|-----------|----------|------|-------------|
| 1 | — | 12.45 | 0.99 | 9.28 | 2 | 0.05 | 2.77 |
| 2 | 1 | 12.57 | 0.99 | 9.3 | 2 | 0.05 | 2.79 |
| 3 | 6.84 | 12.17 | 0.97 | 9.01 | 1.93 | 0.05 | 2.76 |

All ink compositions had a final pH of 8.2 subsequent to the final pH adjustment by addition of phosphorous acid. The inks were incorporated into a Hewlett-Packard DeskJet 500 thermal ink jet printer and latency and recoverability were tested by operating the printer in the "de-cap" mode, in which the built-in maintenance procedures of maintaining the ink jet nozzles capped in a high humidity environment, were circumvented. After generating prints, the printer was stopped for a 24 hour period, followed by again generating prints without any prior maintenance or priming of the nozzles. Ink 1, which contained no betaine, required 1.5 pages of printing to recover, with no jets printing until nearly an entire 1.5 inch solid square had been printed. Ink 2, containing 1 percent by weight betaine, required 0.5 page of printing to recover, with several jets operational from the first printed character. Ink 3, containing about 7 percent by weight betaine, required 0.4 page to recover, with nearly all jets operational by the end of the first line of text. Inks 2 and 3 also exhibited superior waterfastness compared to that of ink 1.

EXAMPLE VIII

Four ink compositions with the contents shown in the table below were prepared by the process described in Example I hereinabove, with the exception that none of the inks contained sulfolane and a biocide was also added at the same time as the polyethylene oxide. All amounts are percentage by weight in the ink of the indicated component, with the balance constituting water:

| Ink | Betaine | Dye | N-BAPED | NH$_4$OH | PEO | Biocide | H$_3$PO$_3$ | pH |
|-----|---------|-------|---------|----------|------|---------|-------------|------|
| 1 | — | 12.51 | 1.01 | 1.98 | 0.05 | 0.10 | 2.46 | 8.54 |
| 2 | 5.02 | 12.47 | 0.98 | 2.01 | 0.05 | 0.10 | 2.55 | 8.53 |
| 3 | 10.03 | 12.46 | 1.01 | 2 | — | 0.10 | 2.67 | 8.24 |
| 4 | 16.02 | 12.47 | 1.01 | 2.12 | — | 0.10 | 2.85 | 8.21 |

Ink 1, which contained no betaine, was unstable and exhibited significant dye precipitation when the ink was filtered through a 0.2 micron filter. Inks 2, 3, and 4, in contrast, were stable and exhibited no dye precipitation when filtered through a 0.2 micron filter. Inks 2, 3, and 4 were incorporated into a Hewlett-Packard DeskJet 500 thermal ink jet printer and latency and recoverability were tested by operating the printer in the "de-cap" mode, in which the built-in maintenance procedures of maintaining the ink jet nozzles capped in a high humidity environment, were circumvented. After generating prints, the printer was stopped for a 24 hour period, followed by again generating prints without any prior maintenance or priming of the nozzles. Ink 2, containing about 5 percent by weight betaine, required 5 pages to recover. Ink 3, containing about 10 percent by weight betaine, required 1.5 pages to recover, with no jets printing until 0.5 page had been printed. Ink 4, containing about 16 percent by weight betaine, required no time for recovery; this ink exhibited immediate recovery, with all 50 jets printing immediately after 1 day and 1 week decap, and after 1 month decap, exhibited essentially immediate recovery in that 48 jets were operational for the first text character and all 50 jets were operational for the second text character.

EXAMPLE IX

Ink compositions with the contents indicated in the table below were prepared by admixing the ingredients in a roll mill at room temperature. The dye in each instance was BASF X-34 black dye, except for ink 5, in which the ink was Direct Red 227, obtained from Tricon. In each instance, the anion containing compound was obtained from Aldrich Chemical Co. Subsequent to preparation, the inks were coated onto a slide and examined under a microscope for evidence of phase separation. The results were as follows:

| Ink | Anionic Compound | Water | Dye | Sulfolane | NH$_4$OH* | Phase Sep'n |
|-----|------------------|---------|---------|-----------|-----------|-------------|
| 1 | NH$_4$Cl, 1 g | 77.52 g | 11.51 g | 10 g | 1 drop | No |
| 2 | NH$_4$Cl, 1.01 g | 77.56 g | 11.5 g | 10.01 g | — | No |
| 3 | polyphosphoric acid, 1.5 g; NaOH**, 1.09 g | 75.16 g | 11.57 g | 10.08 g | — | Yes |
| 4 | (NH$_4$)$_3$PO$_3$***, 2.98 g | 8.99 g | 11.56 g | 81.73 g | — | Yes |
| 5 | (NH$_4$)$_3$PO$_3$***, 0.2 g | 2.54 g | 0.01 g | 0.5 g | — | Yes |
| 6 | NH$_4$I, 1.5 g | 75.86 g | 11.52 g | 10.1 g | 1 drop | No |
| 7 | ammonium hexafluorophosphate, 1.5 g | 75.86 g | 11.54 g | 10.04 g | 1 drop | Yes |
| 8 | H$_3$PO$_4$ (conc.), 1 g | 75.86 g | 11.61 g | 10 g | 1.56 g | Yes |
| 9 | H$_2$SO$_4$ (conc.), 1.07 g | 77.5 g | 11.53 g | 10.03 g | 1.54 g | Yes |
| 10 | H$_3$PO$_2$, 2.01 g | 75.6 g | 11.71 g | 10 g | 1.23 g | Yes |
| 11 | glycolic acid, 1 g | 37.1 g | 6.06 g | 5 g | 1.23 g | Yes |
| 12 | NH$_4$CH$_3$COO, 1.02 g | 37.37 g | 6.04 g | 5.19 g | 1 drop | Yes |

-continued

| Ink | Anionic Compound | Water | Dye | Sulfolane | $NH_4OH$* | Phase Sep'n |
|---|---|---|---|---|---|---|
| 13 | EDTA, 1 g | 36.3 g | 6 g | 5.12 g | 1.44 g | Yes |
| 14 | formic acid, 1.09 g | 37.1 g | 5.98 g | 4.99 g | 1.23 g | Yes |
| 15 | boric acid, 2.91 g | 35.6 g | 5.98 g | 5.04 g | 1.14 g | Yes |
| 16 | $NH_4NO_3$, 1.02 g | 36 g | 6.07 g | 5.02 g | 1 drop | No |
| 17 | $(NH_4)_2SO_3 \cdot H_2O$ 1.07 g | 37.3 g | 5.07 g | 5.05 g | — | Yes |
| 18 | 2-aminoethyl hydrogen sulfate, 1.04 g | 38.86 g | 5.07 g | 5.02 g | 1 drop | No |
| 19 | $NH_4HCO_3$, 1.07 g | 35.8 g | 5.02 g | 5.12 g | — | No |
| 20 | $NH_4NH_2SO_3$, 1.07 g | 37.02 g | 5.07 g | 5.13 g | 1 drop | Yes |

*$NH_4OH$ present in aqueous solution, 61% by weight.
**NaOH added instead of $NH_4OH$ to adjust pH.
***$(NH_4)_3PO_3$, 50% by weight in aqueous solution As the results indicate, the inks containing phosphite, hypophosphite, phosphate, polyphosphate, sulfate, hexafluorophosphate, glycolate, acetate, ethylenediaminetetraacetate, formate, borate, sulfite, and sulfamate anions exhibited phase separation, whereas the inks containing other anions did not exhibit phase separation.

EXAMPLE X

Four ink compositions were prepared by the method described in Example II. The ink compositions were as follows:

Ink 1: water, 80.93 g; N-BAPED, 0.71 g; ammonium hydroxide, 1.99 g; phosphorous acid (50 percent by weight in water), 2.65 g; sulfolane, 12.42 g; BASF X-34 dye, 1.08 g; Direct Red 227 dye, 0.22 g; polyethylene oxide, 0.0486 g; Dowicil-200, 0.098 g.

Ink 2: water, 81.01 g; N-BAPED, 0.69 g; ammonium hydroxide, 2.02 g; glacial acetic acid (obtained from Aldrich Chemical Co.), 2.66 g; sulfolane, 12.34 g; BASF X-34 dye, 1.05 g; Direct Red 227 dye, 0.23 g; polyethylene oxide, 0.1008 g; Dowicil-200, 0.098 g.

Ink 3: water, 59.68 g; N-BAPED, 1 g; ammonium hydroxide, 2 g; phosphorous acid (70 percent by weight in water), 2.65 g; betaine, 9.97 g; sulfolane, 9.24 g; 1-cyclohexyl-2-pyrrolidinone (obtained from Aldrich Chemical Co.), 4.07 g; BASF X-34 dye, 10.59 g; Direct Red 227 dye, 1.89 g; polyethylene oxide, 0.049 g; Dowicil-200, 0.0997 g.

Ink 4: water, 69.66 g; N-BAPED, 1 g; ammonium hydroxide, 1.99 g; phosphorous acid (70 percent by weight in water), 2.73 g; betaine, 10.01 g; sulfolane, 9.24 g; 1-cyclohexyl-2-pyrrolidinone (obtained from Aldrich Chemical Co.), 4.05 g; BASF X-34 dye, 1.08 g; Direct Red 227 dye, 0.19 g; polyethylene oxide, 0.0505 g; Dowicil-200, 0.0993 g.

The inks thus prepared were each incorporated into capillary tubes, which were observed under a microscope for phase separation. The inks containing phosphorous acid exhibited phase separation at the tip of the capillary tube between 30 and 60 seconds after incorporation into the capillary tube, whereas the ink containing glacial acetic acid did not exhibit phase separation after 2 minutes in the capillary tube.

EXAMPLE XI

An ink composition was prepared as follows. To 2,600.06 grams of deionized water was added 40.00 grams of N,N'-bis(3-aminopropyl)-1,2-ethylenediamine (obtained from BASF), 80 grams of ammonium hydroxide, 100.21 grams of phosphorous acid (70 percent by weight in water), 247.42 grams of sulfolane, 120.00 grams of betaine, and 75.21 grams of Direct Red 227 dye (obtained from Triton Colors). The resulting mixture was stirred for 5 minutes. Thereafter, 424.00 grams of BASF X-34 black dye (obtained from BASF), was added, followed by stirring the mixture for 10 minutes. Subsequently, to the mixture was added 2.00 grams of polyethylene oxide (obtained from Polyscience) and 4.00 grams of Dowicil 150 biocide, followed by stirring the mixture for 10 minutes. The resulting mixture had a pH of 8.58. To this mixture was added an additional 8.62 grams of a 70 percent by weight solution of phosphorous acid, bringing the pH to 8.2. An additional 11.05 grams of deionized water was added, followed by roll milling for 30 minutes and subsequent filtering to yield an ink composition.

EXAMPLE XII

An ink composition was prepared as follows. To 51.15 grams of deionized water was added 14 grams of urea (obtained from BP Industrial), 1.01 grams of N,N'-bis(3-aminopropyl)-1,2-ethylenediamine (obtained from BASF) and 3.09 grams of ammonium hydroxide. The resulting mixture was roll milled for 5 minutes, after which the pH of the mixture was 11.82. Thereafter, 6.54 grams of a 50 percent by weight solution of methylphosphonic acid (obtained from Aldrich Chemical Co., Milwaukee, Wis.) was added to the mixture, which was then roll milled for another 5 minutes, after which the pH was 8.52. Subsequently, to the mixture was added 6.2 grams of 97 percent by weight sulfolane (obtained from Phillips 66 Company), 10.64 grams of BASF X-34 black dye (obtained from BASF), 0.3 gram of Duasyn Brilliant Red F3B VP218 dye (obtained from Hoechst), 0.0962 gram of Dowicil 200 biocide (obtained from Dow Chemical Co.), and 0.0502 gram of polyethylene oxide (obtained from Polysciences), followed by roll milling the mixture for 15 minutes. The resulting mixture had a pH of 8.43. To this mixture was added an additional 0.44 gram of a 50 percent by weight solution of methylphosphonic acid, bringing the pH to 8.21. An additional 6.64 grams of deionized water was added, followed by roll milling for 10 minutes and subsequent filtering to yield an ink composition.

The ink composition thus prepared was incorporated into a Hewlett-Packard DeskJet 500 thermal ink jet printer and high quality prints were generated on paper. Latency and recoverability were tested by operating the printer in the "de-cap" mode, in which the built-in maintenance procedures of maintaining the ink jet nozzles capped in a high humidity environment, were circumvented. After generating prints, the printer was stopped for a 24 hour period, followed by again generating prints without any prior maintenance or priming of the nozzles. The ink composition began generating high quality images after 0.75 page of printing had been generated under these conditions.

EXAMPLE XIII

An ink composition was prepared as follows. To 52.68 grams of deionized water was added 14 grams of urea (obtained from BP Industrial), 1 gram of N,N'-bis(3-aminopropyl)-1,2-ethylenediamine (obtained from BASF) and 3.01 grams of ammonium hydroxide. The resulting mixture was roll milled for 5 minutes, after which the pH of the mixture was 11.70. Thereafter, 5.52 grams of a solution containing 50 percent by weight water, 25 percent by weight methylphosphonic acid and 25 percent by weight phosphorous acid (obtained from Aldrich Chemical Co., Milwaukee, Wis.) was added to the mixture, which was then roll milled for another 5 minutes, after which the pH was 8.57. Subsequently, to the mixture was added 6.18 grams of 97 percent by weight sulfolane (obtained from Phillips 66 Company), 10.61 grams of BASF X-34 black dye (obtained from BASF), 0.3 gram of Duasyn Brilliant Red F3B VP218 dye (obtained from Hoechst), 0.0997 gram of Dowicil 200 biocide (obtained from Dow Chemical Co.), and 0.0506 gram of polyethylene oxide (obtained from Polysciences), followed by roll milling the mixture for 15 minutes. The resulting mixture had a pH of 8.40. To this mixture was added an additional 0.27 gram of the 50 percent by weight solution of methylphosphonic acid and phosphorous acid, bringing the pH to 8.19. An additional 6.52 grams of deionized water was added, followed by roll milling for 10 minutes and subsequent filtering to yield an ink composition.

The ink composition thus prepared was incorporated into a Hewlett-Packard DeskJet 500 thermal ink jet printer and high quality prints were generated on paper. Latency and recoverability were tested by operating the printer in the "de-cap" mode, in which the built-in maintenance procedures of maintaining the ink jet nozzles capped in a high humidity environment, were circumvented. After generating prints, the printer was stopped for a 24 hour period, followed by again generating prints without any prior maintenance or priming of the nozzles. The ink composition began generating high quality images after 0.5 page of printing had been generated under these conditions.

EXAMPLE XIV

An ink composition was prepared as follows. To 48.8 grams of deionized water was added 1.01 grams of N,N'-bis(3-aminopropyl)-1,2-ethylenediamine (obtained from BASF) and 2.05 grams of ammonium hydroxide. The resulting mixture was roll milled for 5 minutes, after which the pH of the mixture was 11.86. Thereafter, 5.24 grams of a 50 percent by weight solution of hypophosphorous acid (obtained from Aldrich Chemical Co., Milwaukee, Wis.) was added to the mixture, which was then roll milled for another 5 minutes, after which the pH was 8.58. Subsequently, to the mixture was added 25.02 grams of dimethyl sulfoxide (obtained from Baker Chemical Co.), 10.86 grams of BASF X-34 black dye (obtained from BASF), 0.3 gram of Duasyn Brilliant Red F3B VP218 dye (obtained from Hoechst), 0.0986 gram of Dowicil 200 biocide (obtained from Dow Chemical Co.), and 0.0493 gram of polyethylene oxide (obtained from Polysciences), followed by roll milling the mixture for 15 minutes. The resulting mixture had a pH of 8.34. To this mixture was added an additional 0.18 gram of a 50 percent by weight solution of hypophosphorous acid, bringing the pH to 8.20. An additional 6.68 grams of deionized water was added, followed by roll milling for 10 minutes and subsequent filtering to yield an ink composition.

EXAMPLE XV

An ink composition was prepared as follows. To 55.11 grams of deionized water was added 1.01 grams of N,N'-bis(3-aminopropyl)-1,2 -ethylenediamine (obtained from BASF) and 2.04 grams of ammonium hydroxide. The resulting mixture was roll milled for 5 minutes, after which the pH of the mixture was 11.78. Thereafter, 5.14 grams of a 50 percent by weight solution of hypophosphorous acid (obtained from Aldrich Chemical Co., Milwaukee, Wis.) was added to the mixture, which was then roll milled for another 5 minutes, after which the pH was 8.61. Subsequently, to the mixture was added 18.55 grams of 97 percent by weight sulfolane (obtained from Phillips 66 Company), 10.61 grams of BASF X-34 black dye (obtained from BASF), 0.29 gram of Duasyn Brilliant Red F3B VP218 dye (obtained from Hoechst), 0.0978 gram of Dowicil 200 biocide (obtained from Dow Chemical Co.), and 0.0512 gram of polyethylene oxide (obtained from Polysciences), followed by roll milling the mixture for 15 minutes. The resulting mixture had a pH of 8.40. To this mixture was added an additional 0.18 gram of a 50 percent by weight solution of hypophosphorous acid, bringing the pH to 8.20. An additional 6.91 grams of deionized water was added, followed by roll milling for 10 minutes and subsequent filtering to yield an ink composition.

The ink composition thus prepared was incorporated into a Hewlett-Packard DeskJet 500 thermal ink jet printer and high quality prints were generated on paper. Latency and recoverability were tested by operating the printer in the "de-cap" mode, in which the built-in maintenance procedures of maintaining the ink jet nozzles capped in a high humidity environment, were circumvented. After generating prints, the printer was stopped for a 24 hour period, followed by again generating prints without any prior maintenance or priming of the nozzles. The ink composition began generating high quality images after 2 pages of printing had been generated under these conditions.

EXAMPLE XVI

An ink composition was prepared as follows. To 49.65 grams of deionized water was added 1.03 grams of N,N'-bis(3-aminopropyl)-1,2-ethylenediamine (obtained from BASF) and 2.01 grams of ammonium hydroxide. The resulting mixture was roll milled for 5 minutes, after which the pH of the mixture was 11.90. Thereafter, 4.27 grams of an aqueous solution containing 50 percent by weight water, 25 percent by weight hypophosphorous acid, and 25 percent by weight phosphorous acid (obtained from Aldrich Chemical Co., Milwaukee, Wis.) was added to the mixture, which was then roll milled for another 5 minutes, after which the pH was 8.49. Subsequently, to the mixture was added 18.55 grams of 97 percent by weight sulfolane (obtained from Phillips 66 Company), 10.62 grams of BASF X-34 black dye (obtained from BASF), 0.3 gram of Duasyn Brilliant Red F3B VP218 dye (obtained from Hoechst), 0.1016 gram of Dowicil 200 biocide (obtained from Dow Chemical Co.), and 0.0496 gram of polyethylene oxide (obtained from Polysciences), followed by roll milling the mixture for 15 minutes. The resulting mixture had a pH of 8.21. An additional 5.56 grams of deionized water was added, followed by roll milling for 10 minutes and subsequent filtering to yield an ink composition.

The ink composition thus prepared was incorporated into a Hewlett-Packard DeskJet 500 thermal ink jet printer and high quality prints were generated on paper. Latency and recoverability were tested by operating the printer in the "de-cap" mode, in which the built-in maintenance procedures of maintaining the ink jet nozzles capped in a high humidity environment, were circumvented. After generating prints, the printer was stopped for a 24 hour period, followed by again generating prints without any prior maintenance or priming of the nozzles. The ink composition began generating high quality images after I page of printing had been generated under these conditions.

EXAMPLE XVII

An ink composition was prepared as follows. To 48.92 grams of deionized water was added 1.01 grams of N,N'-bis(3-aminopropyl)-1,2-ethylenediamine (obtained from BASF) and 2.02 grams of ammonium hydroxide. The resulting mixture was roll milled for 5 minutes, after which the pH of the mixture was 11.88. Thereafter, 4.13 grams of an aqueous solution containing 50 percent by weight water, 25 percent by weight hypophosphorous acid, and 25 percent by weight phosphorous acid (obtained from Aldrich Chemical Co., Milwaukee, Wis.) was added to the mixture, which was then roll milled for another 5 minutes, after which the pH was 8.68. Subsequently, to the mixture was added 24.93 grams of dimethyl sulfoxide (obtained from Baker Chemical Co.), 10.84 grams of BASF X-34 black dye (obtained from BASF), 0.3 gram of Duasyn Brilliant Red F3B VP218 dye (obtained from Hoechst), 0.1 gram of Dowicil 200 biocide (obtained from Dow Chemical Co.), and 0.0503 gram of polyethylene oxide (obtained from Polysciences), followed by roll milling the mixture for 15 minutes. The resulting mixture had a pH of 8.36. To this mixture was added an additional 0.19 gram of an aqueous solution containing 50 percent by weight water, 25 percent by weight hypophosphorous acid, and 25 percent by weight phosphorous acid, bringing the pH to 8.21. An additional 7.75 grams of deionized water was added, followed by roll milling for 10 minutes and subsequent filtering to yield an ink composition.

The ink composition thus prepared was incorporated into a Hewlett-Packard DeskJet 500 thermal ink jet printer and high quality prints were generated on paper. Latency and recoverability were tested by operating the printer in the "de-cap" mode, in which the built-in maintenance procedures of maintaining the ink jet nozzles capped in a high humidity environment, were circumvented. After generating prints, the printer was stopped for a 24 hour period, followed by again generating prints without any prior maintenance or priming of the nozzles. The ink composition began generating high quality images after 1 page of printing had been generated under these conditions.

EXAMPLE XVIII

An ink composition was prepared as follows. To 68.76 grams of deionized water was added 1.01 grams of N,N'-bis(3-aminopropyl)-1,2-ethylenediamine (obtained from BASF) and 2.07 grams of ammonium hydroxide. The resulting mixture was roll milled for 10 minutes, after which the pH of the mixture was 11.62. Thereafter, 3.5 grams of phenylphosphonic acid (obtained from Aldrich Chemical Co., Milwaukee, Wis.) was added to the mixture, which was then roll milled for another 5 minutes, after which the pH was 8.56. Subsequently, to the mixture was added 6.33 grams of 97 percent by weight sulfolane (obtained from Phillips 66 Company), 10.58 grams of BASF X-34 black dye (obtained from BASF), 2.99 gram of Duasyn Brilliant Red F3B VP218 dye (obtained from Hoechst), 0.1009 gram of Dowicil 200 biocide (obtained from Dow Chemical Co.), 3 grams of betaine (obtained from Esprit), and 0.0493 gram of polyethylene oxide (obtained from Polysciences), followed by roll milling the mixture for 15 minutes. The resulting mixture had a pH of 8.32. An additional 1.69 grams of deionized water was added, followed by roll milling for 10 minutes and subsequent filtering to yield an ink composition.

The ink composition thus prepared was incorporated into a Hewlett-Packard DeskJet 500 thermal ink jet printer and high quality prints were generated on paper. Latency and recoverability were tested by operating the printer in the "de-cap" mode, in which the built-in maintenance procedures of maintaining the ink jet nozzles capped in a high humidity environment, were circumvented. After generating prints, the printer was stopped for a 24 hour period, followed by again generating prints without any prior maintenance or priming of the nozzles. The ink composition began generating high quality images after 0.5 page of printing had been generated under these conditions. The images thus generated exhibited a waterfastness of 97 percent.

EXAMPLE XIX

An ink composition was prepared as follows. To 70.03 grams of deionized water was added 1.00 grams of N,N'-bis(3-aminopropyl)-1,2-ethylenediamine (obtained from BASF) and 2.00 grams of ammonium hydroxide. The resulting mixture was roll milled for 10 minutes, after which the pH of the mixture was 12.0. Thereafter, 4.59 grams of phenylphosphinic acid (obtained from Aldrich Chemical Co., Milwaukee, Wis.) was added to the mixture, which was then roll milled for another 5 minutes, after which the pH was 9.10. Subsequently, to the mixture was added 6.18 grams of 97 percent by weight sulfolane (obtained from Phillips 66 Company), 10.60 grams of BASF X-34 black dye (obtained from BASF), 1.88 gram of Duasyn Brilliant Red F3B VP218 dye (obtained from Hoechst), 0.10 gram of Dowicil 200 biocide (obtained from Dow Chemical Co.), 3 grams of betaine (obtained from Esprit), and 0.05 gram of polyethylene oxide (obtained from Polysciences), followed by roll milling the mixture for 15 minutes. The resulting mixture had a pH of 9.1. An additional 1.07 grams of phenylphosphinic acid was added, bringing the pH to 8.20, followed by addition of an additional 1.69 grams of deionized water, roll milling for 30 minutes, and subsequent filtering to yield an ink composition.

The ink composition thus prepared was incorporated into a Hewlett-Packard DeskJet 500 thermal ink jet printer and high quality prints were generated on paper. Latency and recoverability were tested by operating the printer in t he "de-cap" mode, in which the built-in maintenance procedures of maintaining the ink jet nozzles capped in a high humidity environment, were circumvented. After generating prints, the printer was stopped for a 24 hour period, followed by again generating prints without any prior maintenance or priming of the nozzles. The ink composition began generating high quality images after 0.5 page of printing had been generated under these conditions.

EXAMPLE XX

Ink compositions are prepared as described in Examples I through XVIII with the exception that hypophosphoric acid, prepared as described in S. Ohasi, "Lower Oxo Acids of Phosphorus and Their Salts", in *Topics in Phosphorus Chemistry*, Vol. 1, M. Grayson et al., eds., New York (1964), the disclosure of which is totally incorporated herein by reference, is substituted for phosphorous, hypophosphorous, or methylphosphorous acid. It is believed that substantially similar results will be observed.

EXAMPLE XXI

An ink composition was prepared as follows. To 62.02 grams of deionized water was added 19 grams of diethylene glycol (obtained from Aldrich Chemical Co.), 9.01 grams of butyl carbitol (obtained from Aldrich Chemical Co.), 0.2 gram of Pluronic PE (BPE) surfactant (obtained from BASF), 0.0304 gram of polyethylene oxide (obtained from Polysciences), and 0.0995 gram of Dowicil 200 biocide (obtained from Dow Chemical Co.). The resulting mixture was roll milled for 10 minutes. Thereafter, 2.02 grams of triethanolamine (obtained from Aldrich Chemical Co., Milwaukee, Wis.) was added to the mixture, after which the pH was 9.27. To the mixture was then added 0.56 gram of an aqueous solution containing 70 percent by weight phosphorous acid (obtained from Rhone-Poulenc), after which the pH of the mixture was 7.51. Subsequently, to the mixture was added 2.19 grams of Duasyn Brilliant Red F3B VP218 dye (obtained from Hoechst), followed by roll milling the mixture for 30 minutes. The resulting mixture had a pH of 7.61. Subsequent to addition of a further 0.15 gram of the 70 percent by weight solution of phosphorous acid, the mixture had a pH of 7.25. An additional 4.22 grams of deionized water was added, followed by roll milling for 10 minutes and subsequent filtering to yield an ink composition.

The ink composition thus prepared was incorporated into a Hewlett-Packard DeskJet 500 thermal ink jet printer and high quality prints were generated on paper. Latency and recoverability were tested by operating the printer in the "de-cap" mode, in which the built-in maintenance procedures of maintaining the ink jet nozzles capped in a high humidity environment, were circumvented. After generating prints, the printer was stopped for a 24 hour period, followed by again generating prints without any prior maintenance or priming of the nozzles. The ink composition began generating high quality images these conditions and exhibited immediate recovery, with all 50 jets printing immediately after 1 day.

EXAMPLE XXII

An ink composition was prepared as follows. To 55.18 grams of deionized water was added 1.49 grams of an aqueous solution containing 70 percent by weight phosphorous acid (obtained from Rhone-Poulenc). The resulting mixture was roll milled for 5 minutes, after which the pH was 1.33. Thereafter, 3.81 grams of triethanolamine (obtained from Aldrich Chemical Co., Milwaukee, Wis.) was added to the mixture and the mixture was roll milled for an additional 5 minutes, after which the pH was 6.95. To the mixture was then added 19.99 grams of ethylene glycol and 3.49 grams of isopropanol, followed by roll milling the mixture for 10 minutes. To the mixture was then added 11.53 grams of BASF X-34 black dye (obtained from BASF), 0.0511 gram of polyethylene oxide (obtained from Polyscience), and 0.1004 gram of Dowicil (obtained from Dow Chemical Co.), followed by roll milling for 10 minutes, after which the pH of the mixture was 7.13. Subsequent to addition of a further 0.95 gram of triethanolamine, the mixture had a pH of 7.53. An additional 3.63 grams of deionized water was added, followed by roll milling for 10 minutes and subsequent filtering to yield an ink composition.

The ink composition thus prepared was incorporated into a Hewlett-Packard DeskJet 500 thermal ink jet printer and high quality prints were generated on paper. Latency and recoverability were tested by operating the printer in the "de-cap" mode, in which the built-in maintenance procedures of maintaining the ink jet nozzles capped in a high humidity environment, were circumvented. After generating prints, the printer was stopped for a 24 hour period, followed by again generating prints without any prior maintenance or priming of the nozzles. The ink composition began generating high quality images after 0.3 page of printing had been generated under these conditions.

Other embodiments and modifications of the present invention may occur to those skilled in the art subsequent to a review of the information presented herein, these embodiments and modifications, as well as equivalents thereof, are also included within the scope of this invention.

What is claimed is:

1. An ink composition which comprises water, a colorant, and a phosphite salt of the general formula

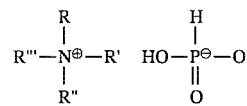

or

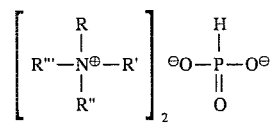

wherein R, R', R" and R'" can each, independently of each other, be hydrogen, an alkyl group, a substituted alkyl group, an aryl group, or a substituted aryl group.

2. An ink composition according to claim 1 wherein R, R', R" and R'" can each, independently of each other, be an alkyl group with from 1 to about 16 carbon atoms, a substituted alkyl group with from 1 to about 16 carbon atoms, an aryl group with from 6 to about 14 carbon atoms, or a substituted aryl group with from 6 to about 16 carbon atoms.

3. An ink composition according to claim 1 wherein R, R', R" and R'" can each, independently of each other, be a substituted alkyl group or a substituted aryl group, wherein the substituents are selected from the group consisting of alkyl groups, aryl groups, hydroxyl groups, sulfate groups, ether groups, amine groups, sulfone groups, phosphone groups, and mixtures thereof.

4. An ink composition according to claim 1 wherein the phosphite salt is ammonium phosphite.

5. An ink composition according to claim 1 wherein the phosphite salt is triethanolamine phosphite.

6. An ink composition according to claim 1 wherein the phosphite salt is present in the ink in an amount of from about 0.1 to about 10 percent by weight of the ink.

7. An ink composition which comprises water, a colorant, and an acid selected from the group consisting of hypophosphoric acid, hypophosphorous acid, aryl phosphonic acids, alkyl phosphinic acids, aryl phosphinic acids, and mixtures thereof.

8. An ink composition according to claim 7 wherein the acid is hypophosphoric acid.

9. An ink composition according to claim 7 wherein the acid is hypophosphorous acid.

10. An ink composition according to claim 7 wherein the acid is an aryl phosphonic acid.

11. An ink composition according to claim 10 wherein the aryl phosphonic acid is of the formula

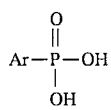

wherein Ar is an aryl group with from 6 to about 14 carbon atoms or a substituted aryl group with from 6 to about 22 carbon atoms.

12. An ink composition according to claim 7 wherein the acid is an alkyl phosphinic acid.

13. An ink composition according to claim 12 wherein the alkyl phosphinic acid is of the formula

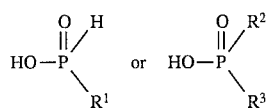

wherein $R^1$, $R^2$, and $R^3$ are each, independently of the others, alkyl groups with from 1 to about 16 carbon atoms or substituted alkyl groups with from 1 to about 16 carbon atoms.

14. An ink composition according to claim 7 wherein the acid is an aryl phosphinic acid.

15. An ink composition according to claim 14 wherein the aryl phosphinic acid is of the formula

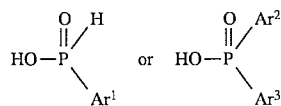

wherein $Ar^1$, $Ar^2$, and $Ar^3$ are each, independently of the others, aryl groups with from 6 to about 14 carbon atoms or substituted aryl groups with from 6 to about 22 carbon atoms.

16. An ink composition which comprises water, a colorant, and an acid selected from the group consisting of alkyl phosphonic acids of the formula

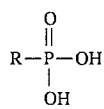

wherein R is an alkyl group with from 1 to about 16 carbon atoms or a substituted alkyl group with from 1 to about 16 carbon atoms, wherein the substituents are selected from the group consisting of alkyl groups, aryl groups, hydroxyl groups, sulfate groups, and ether groups.

17. An ink composition according to claim 16 wherein the alkyl phosphonic acid is selected from the group consisting of methylphosphonic acid and ethyl phosphonic acid.

18. An ink composition which comprises water, a colorant, and a salt selected from the group consisting of hypophosphate salts, hypophosphite salts, alkyl phosphite salts, aryl phosphite salts, alkyl phosphonite salts, aryl phosphonite salts, and mixtures thereof.

19. An ink composition according to claim 18 wherein the salt is a hypophosphate salt.

20. An ink composition according to claim 19 wherein the hypophosphate salt is a trihydrogen hypophosphate salt.

21. An ink composition according to claim 19 wherein the hypophosphate salt is a dihydrogen hypophosphate salt.

22. An ink composition according to claim 19 wherein the hypophosphate salt is a monohydrogen hypophosphate salt.

23. An ink composition according to claim 18 wherein the salt is a hypophosphite salt.

24. An ink composition according to claim 18 wherein the salt is an alkyl phosphite salt.

25. An ink composition according to claim 24 wherein the alkyl phosphite salt is of the formula

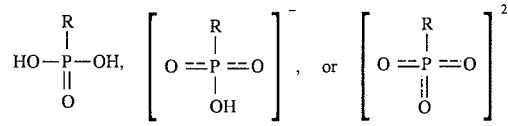

wherein R is an alkyl group with from 1 to about 16 carbon atoms or a substituted alkyl group with from 1 to about 16 carbon atoms.

26. An ink composition according to claim 18 wherein the salt is an aryl phosphite salt.

27. An ink composition according to claim 26 wherein the aryl phosphite salt is of the formula

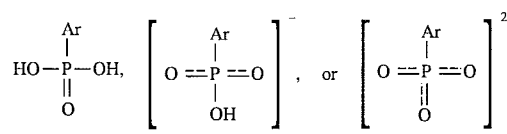

wherein Ar is an aryl group with from 6 to about 14 carbon atoms or a substituted aryl group with from 6 to about 22 carbon atoms.

28. An ink composition according to claim 18 wherein the salt is an alkyl phosphonite salt.

29. An ink composition according to claim 28 wherein the alkyl phosphonite salt is of the formula

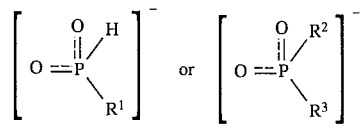

wherein $R^1$, $R^2$, and $R^3$ are each, independently of the others, alkyl groups with from 1 to about 16 carbon atoms or substituted alkyl groups with from 1 to about 16 carbon atoms.

30. An ink composition according to claim 18 wherein the salt is an aryl phosphonite salt.

31. An ink composition according to claim 30 wherein the aryl phosphonite salt is of the formula

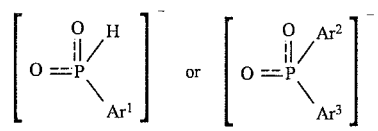

wherein $Ar^1$, $Ar^2$, and $Ar^3$ are each, independently of the others, aryl groups with from 6 to about 14 carbon atoms or substituted aryl groups with from 6 to about 22 carbon atoms.

32. A process for preparing an ink composition which comprises admixing water, a colorant, a base, and an acid selected from the group consisting of hypophosphoric acid, hypophosphorous acid, alkyl phosphonic acids, aryl phosphonic acids, alkyl phosphinic acids, aryl phosphinic acids, and mixtures thereof, wherein the pH of the ink is adjusted by a process selected from the group consisting of (a) adding the acid to an aqueous solution containing the base, and (b) adding the base to an aqueous solution containing the acid.

33. A process according to claim 32 wherein the base is triethanolamine.

34. An ink composition prepared according to the process of claim 32.

35. A process for preparing an ink composition which comprises (a) forming a mixture by admixing water and a base; (b) adding a colorant to the mixture; and (c) adjusting the pH of the mixture by adding thereto an acid selected from the group consisting of hypophosphoric acid, hypophosphorous acid, alkyl phosphonic acids, aryl phosphonic acids, alkyl phosphinic acids, aryl phosphinic acids, and mixtures thereof.

36. A process for preparing an ink composition which comprises (a) forming a mixture by admixing water and an acid selected from the group consisting of hypophosphoric acid, hypophosphorous acid, alkyl phosphonic acids, aryl phosphonic acids, alkyl phosphinic acids, aryl phosphinic acids, and mixtures thereof; (b) adding a colorant to the mixture; and (c) adjusting the pH of the mixture by adding a base thereto.

* * * * *